(12) United States Patent
Jung et al.

(10) Patent No.: US 11,729,729 B2
(45) Date of Patent: *Aug. 15, 2023

(54) APPARATUS AND METHOD FOR TRACKING SYNCHRONIZATION IN WIRELESS COMMUNICATION SYSTEM

(71) Applicant: Samsung Electronics Co., Ltd., Suwon-si (KR)

(72) Inventors: Doyoung Jung, Suwon-si (KR); Sangkyou Ryou, Suwon-si (KR); Ingil Baek, Suwon-si (KR); Junhee Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/675,205

(22) Filed: Feb. 18, 2022

(65) Prior Publication Data

US 2022/0174627 A1    Jun. 2, 2022

Related U.S. Application Data

(63) Continuation of application No. 16/295,602, filed on Mar. 7, 2019, now Pat. No. 11,259,257.

(30) Foreign Application Priority Data

Mar. 7, 2018  (KR) .................. 10-2018-0027090

(51) Int. Cl.
*H04W 56/00*  (2009.01)
*H04W 16/28*  (2009.01)

(52) U.S. Cl.
CPC ....... *H04W 56/0005* (2013.01); *H04W 16/28* (2013.01)

(58) Field of Classification Search
None
See application file for complete search history.

(56) References Cited

U.S. PATENT DOCUMENTS

| 2010/0027603 A1* | 2/2010 | Beadle | G01S 5/0294 |
| | | | 375/226 |
| 2016/0099761 A1 | 4/2016 | Chen et al. | |

(Continued)

FOREIGN PATENT DOCUMENTS

| KR | 10-2017-0072230 A | 6/2017 |
| WO | 2016/055102 A1 | 4/2016 |
| WO | 2017/180335 A1 | 10/2017 |

OTHER PUBLICATIONS

Korean Office Action dated Sep. 8, 2022, issued in a counterpart Korean Application No. 10-2018-0027090.

(Continued)

*Primary Examiner* — Nguyen H Ngo
(74) *Attorney, Agent, or Firm* — Jefferson IP Law, LLP

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). A terminal and method of the terminal in a wireless communication system are provided. The terminal includes at least one transceiver and at least one processor operatively connected to the at least one transceiver. The at least one processor is configured to acquire synchronization information of a first beam which is a serving beam, update the synchronization information based on the first beam or at least one second beam, determine at least one channel quality of the at least one second beam based on the updated synchronization information, and update the serving beam based on the at least one channel quality.

20 Claims, 23 Drawing Sheets

(56) References Cited

U.S. PATENT DOCUMENTS

| | | |
|---|---|---|
| 2016/0380685 A1 | 12/2016 | Kasher et al. |
| 2017/0279647 A1 | 9/2017 | Yang et al. |
| 2017/0303173 A1* | 10/2017 | Cedergren ........ H04W 36/0085 |
| 2018/0049177 A1 | 2/2018 | Islam et al. |
| 2018/0115958 A1* | 4/2018 | Raghavan ............ H04B 7/0697 |
| 2019/0150013 A1 | 5/2019 | Zhang et al. |
| 2019/0223126 A1* | 7/2019 | Liu ...................... H04W 56/00 |
| 2019/0312629 A1* | 10/2019 | Tang .................... H04B 7/0695 |
| 2020/0036427 A1 | 1/2020 | Zhang et al. |
| 2020/0036430 A1 | 1/2020 | Kim et al. |
| 2020/0052765 A1 | 2/2020 | Islam et al. |

OTHER PUBLICATIONS

International Search Report dated Jun. 14, 2019, issued in International Patent Application No. PCT/KR2019/002666.
TS V5G.211, "Verizon 5G Radio Access (V5G RA) Physical Channels and modulation".
Extended European Search Report dated Apr. 16, 2021, issued in a counterpart European Application No. 19764832.2-1205/3763156.
Indian Office Action dated Jun. 17, 2022, issued in a counterpart Indian Application No. 202017043555.
Korean Office Action dated Mar. 22, 2022, issued in a counterpart Korean Application No. 10-2018-0027090.
Korean Notice of Patent Grant dated Jan. 6, 2023, issued in Korean Patent Application No. 10-2018-0027090.

* cited by examiner

APPARATUS AND METHOD FOR TRACKING SYNCHRONIZATION IN WIRELESS COMMUNICATION SYSTEM

CROSS-REFERENCE TO RELATED APPLICATION(S)

This application is a continuation application of prior application Ser. No. 16/295,602, filed on Mar. 7, 2019, which will be issued as U.S. Pat. No. 11,259,257 on Feb. 22, 2022, which is based on and claimed priority under 35 U.S.C. § 119(a) of a Korean patent application number 10-2018-0027090, filed on Mar. 7, 2018, in the Korean Intellectual Property Office, the disclosure of which is incorporated by reference herein in its entirety.

BACKGROUND

1. Field

The disclosure relates to a wireless communication system. More particularly, the disclosure relates to terminal and a method for tracking synchronization in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'beyond 4G network' or a 'post long term evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In order to overcome the path loss problem caused by the characteristics of an ultra-high frequency (mmWave) band, a 5G communication system is operated to increase signal gain by using a beamforming technique. In a beamforming-based wireless communication system, a terminal not only performs synchronization tracking in order to manage the acquired synchronization, but also performs beam tracking in order to control mobility or a channel change. Synchronization tracking uses a serving beam and beam tracking uses other beams as well as a serving beam, and thus, when interworking between synchronization tracking and beam tracking is not considered, a synchronization failure (or out-of-synchronization) may occur or beam tracking according to mobility may not be performed smoothly.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a terminal and a method for effectively tracking beamforming-based synchronization in a wireless communication system.

Another aspect of the disclosure is to provide a terminal and a method for tracking a beam by considering synchronization in a wireless communication system.

Another aspect of the disclosure is to provide a terminal and a method for efficiently performing interworking between synchronization tracking and beam tracking in a wireless communication system.

Another aspect of the disclosure is to provide a terminal and a method for performing synchronization tracking by using any beam in a wireless communication system.

Additional aspects will be set forth in part in the description which follows and, in part, will be apparent from the description, or may be learned by practice of the presented embodiments.

In accordance with an aspect of the disclosure, a terminal in a wireless communication system is provided. The terminal includes at least one transceiver and at least one processor operatively connected to the at least one transceiver. The at least one processor is configured to acquire synchronization information of a first beam which is a serving beam, update the synchronization information based on the first beam or at least one second beam, determine at least one channel quality of the at least one second beam based on the updated synchronization information, and update the serving beam based on the at least one channel quality.

In accordance with another aspect of the disclosure, a method of a terminal in a wireless communication system is provided. The method includes acquiring synchronization information of a first beam which is a serving beam, updating the synchronization information based on the first beam or at least one second beam, determining at least one channel quality of the at least one second beam based on the updated synchronization information, and updating the serving beam based on the at least one channel quality.

A terminal and a method according to various embodiments perform beam tracking by considering synchronization tracking, and thus can efficiently manage synchronization and mobility in a beamforming system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
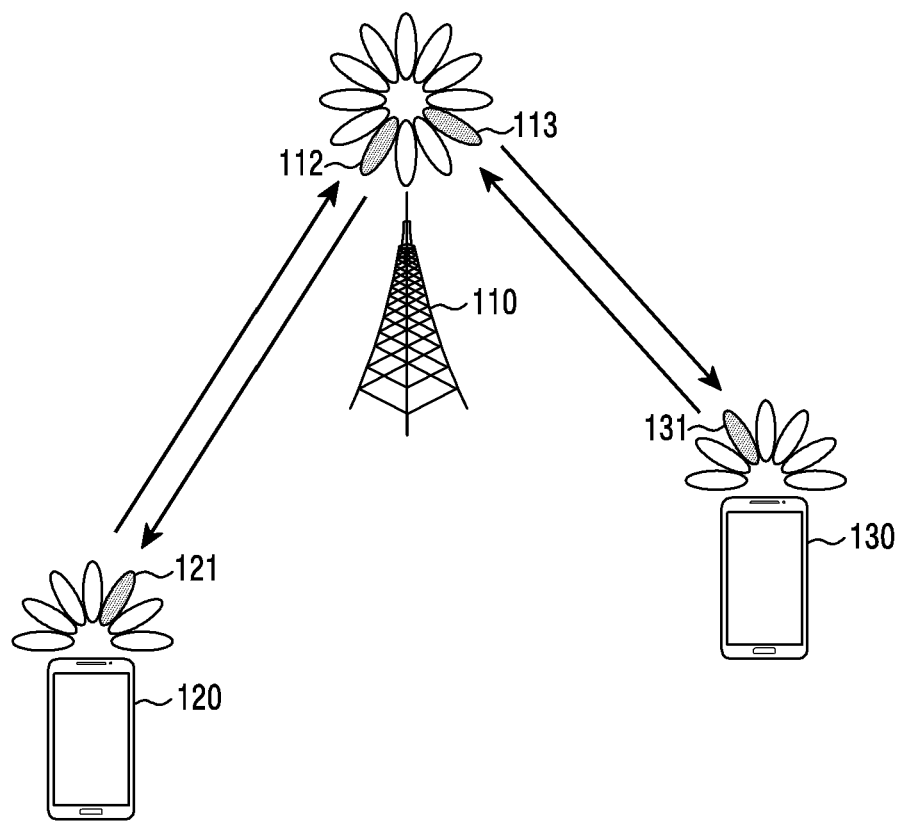
FIG. 1 illustrates a configuration of a wireless communication system according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

All terms used herein, including technical terms and scientific terms, have the same meanings as commonly understood by those having common knowledge in the technical field to which the disclosure pertains. Such terms as those defined in a generally-used dictionary among the terms as used in the disclosure are to be interpreted to have the meanings identical or similar to the contextual meanings in the relevant field of art, and are not to be interpreted to have ideal or excessively formal meanings unless clearly defined in the disclosure. In some cases, even the term defined in the disclosure should not be interpreted to exclude embodiments.

In various embodiments as described hereinafter, a hardware-based approach will be described as an example. However, various embodiments include technology that uses both hardware and software and thus do not exclude a software-based approach.

The disclosure described below relates to a terminal and a method for, in a wireless communication system, interworking between: synchronization tracking for management of synchronization so as to prevent out-of-synchronization;

and beam tracking for search for an optimal beam. Specifically, in the disclosure, a description will be made of technology for, in a wireless communication system, controlling a time point, a condition, a situation, and the like, at/in which each of synchronization tracking and beam tracking is performed, thereby controlling a terminal to prevent the occurrence of out-of-synchronization and searching for an optimal beam according to mobility of a terminal or a change of a wireless channel.

The terms in the following description are used for convenience of description and illustrative purposes to refer to: synchronization acquisition (e.g., synchronization success and out-of-synchronization); signals (e.g., channel and block); beams (e.g., serving beam and neighboring beam); network entities (e.g., base station and cell); elements of a terminal; and the like. Accordingly, the disclosure is not limited to the following terms and other terms having equivalent technical meanings may be used.

Also, in the disclosure, various embodiments are described using the terms used in some communication standards (e.g., 3rd generation partnership project (3GPP)), but this configuration is only an example for description. Various embodiments may also be easily modified and applied to another communication system.

FIG. 1 illustrates a configuration of a wireless communication system according to various embodiments of the disclosure.

FIG. 1 illustrates an example of a base station 110, a terminal 120, and a terminal 130 as some of nodes using a wireless channel in a wireless communication system.

The base station 110 and the terminals 120 and 130 are a network infrastructure which provides radio access. The base station 110 has a coverage defined by a predetermined geographic area based on the distance over which a signal can be transmitted. The base station 110 may be referred to as an "access point (AP)," an "eNodeB (eNB)," a "5th generation node (5G node)," a "wireless point," or other terms having an equivalent technical meaning According to various embodiments, the base station 110 may be connected to at least one transmission/reception point (TRP). Through at least one TRP, the base station 110 may transmit a downlink (DL) signal to the terminal 120 or 130, or may receive an uplink (UL) signal therefrom.

Each of the terminals 120 and 130 is a terminal used by a user, and performs communication with the base station 110 through a wireless channel. In some cases, at least one of the terminals 120 and 130 may be operated without user involvement. That is, at least one of the terminals 120 and 130 is a terminal that performs machine-type communication (MTC), and may not be carried by a user. Each of the terminals 120 and 130 may be referred to as a "user equipment (UE)," a "mobile station," a "subscriber station," a "customer premises equipment (CPE)," a "remote terminal," a "wireless terminal," an "electronic device," a "user device," or other terms having an equivalent technical meaning.

The base station 110 and the terminals 120 and 130 may transmit and receive radio signals in a millimeter wave (mmWave) band (e.g., 28 GHz, 30 GHz, 38 GHz, or 60 GHz). In this example, in order to improve a channel gain, the base station 110 and the terminals 120 and 130 may perform beamforming. In this example, the beamforming may include transmission beamforming and reception beamforming That is, the base station 110 and the terminals 120 and 130 may assign directivity to a transmission signal or a reception signal. To this end, the base station 110 and the terminals 120 and 130 may select serving beams 112, 113, 121, and 131 through a beam search procedure or a beam management procedure. After the serving beams 112, 113, 121, and 131 are selected, subsequent communication may be performed through a resource in a quasi-co-located (QCL) relationship with a resource for transmission of the serving beams 112, 113, 121, and 131.

When large-scale properties of a channel, through which a symbol on a first antenna port has been delivered, can be inferred from a channel through which a symbol on a second antenna port has been delivered, the first and second antenna ports may be regarded as having a QCL relationship. For example, the large-scale properties may include at least one of a delay spread, a Doppler spread, a Doppler shift, an average gain, an average delay, and a spatial receiver parameter.

The terminal 120 may receive a signal from the base station 110 by using a beam, or may transmit a signal to the base station 110 by using a beam. In order to transmit or receive a signal to or from the base station 110, the terminal 120 may acquire synchronization and may manage synchronization so that the acquired synchronization is within an allowable range (hereinafter "synchronization range"). In order to transmit a signal to the base station 110 or receive a signal therefrom in a smooth channel environment, the terminal 120 may determine channel qualities of beams, and may identify an optimal beam based on the determined channel qualities.

In order to manage synchronization, the terminal 120 may schedule the serving beam used when synchronization is acquired. In order to identify an optimal beam, the terminal 120 may schedule neighboring beams as well as a serving beam. Hereinafter, in the disclosure, a description will be made of a method for effectively scheduling a beam in order to manage synchronization and identify an optimal beam, that is, a method for interworking between synchronization tracking and beam tracking.

Figure 2:
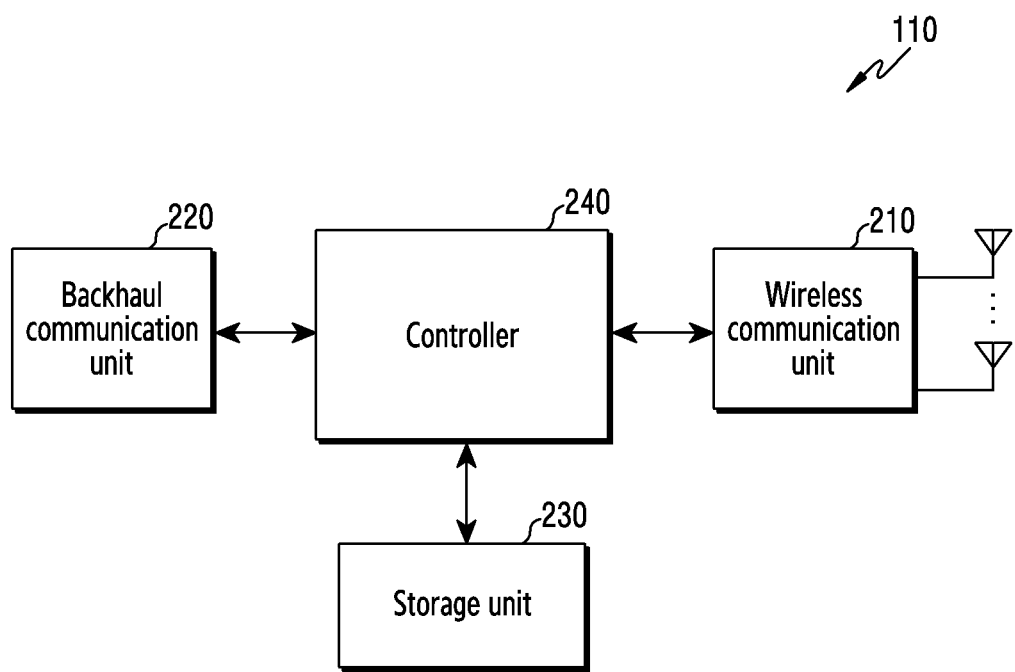
FIG. 2 is a block diagram illustrating an example of a configuration of a base station in a wireless communication system according to various embodiments of the disclosure.

FIG. 2 is a block diagram illustrating an example of a configuration of a base station in a wireless communication system according to various embodiments of the disclosure.

The configuration illustrated in FIG. 2 may be understood as a configuration of the base station 110. The term " . . . unit," the term ending with the suffix " . . . or" or " . . . er," or the like, which is used below, may signify a unit of processing at least one function or operation, and this configuration may be implemented in hardware, software, or as a combination of hardware and software.

Referring to FIG. 2, the base station 110 may include a wireless communication unit 210, a backhaul communication unit 220, a storage unit 230, and a controller 240.

The wireless communication unit 210 is configured to perform functions for transmitting or receiving a signal through a wireless channel. For example, the wireless communication unit 210 is configured to perform a function of conversion between a baseband signal and a bit stream according to a physical layer standard of the system. For example, the wireless communication unit 210 is configured to, when data is transmitted, generate complex symbols by encoding and modulating a transmission bit stream. Also, the wireless communication unit 210 is configured to, when data is received, restore a reception bit stream by demodulating and decoding a baseband signal. Further, the wireless communication unit 210 is configured to up-convert a baseband signal into a radio frequency (RF) band signal and then transmit the RF band signal through an antenna, and is configured to down-convert an RF band signal received through the antenna into a baseband signal.

To this end, the wireless communication unit 210 may include a transmission filter, a reception filter, an amplifier, a mixer, an oscillator, a digital-to-analog converter (DAC), an analog-to-digital converter (ADC), and the like. Also, the wireless communication unit 210 may include multiple transmission/reception paths. Further, the wireless communication unit 210 may include at least one antenna array including multiple antenna elements. In terms of hardware, the wireless communication unit 210 may include a digital unit and an analog unit, and the analog unit may include multiple sub-units according to operating power, an operating frequency, and the like.

The wireless communication unit 210 may transmit or receive a signal. For example, the wireless communication unit 210 may transmit a synchronization signal (SS), a reference signal (RS), system information, a message, control information, data, or the like. Also, the wireless communication unit 210 may perform beamforming Further, in order to assign directivity, which depends on a configuration by the controller 240, to a signal to be transmitted or received, the wireless communication unit 210 may apply a beamforming weight to the signal. The wireless communication unit 210 may repeatedly transmit a signal by changing a beam being formed.

As described above, the wireless communication unit 210 transmits and receives signals. Accordingly, the entirety or part of the wireless communication unit 210 may be referred to as a "transmitter," a "receiver," or a "transceiver." Also, in the following description, transmission and reception performed through a wireless channel has a meaning including the execution of the above-described processing by the wireless communication unit 210.

The backhaul communication unit 220 is configured to provide an interface configured to perform communication with other nodes within a network. That is, the backhaul communication unit 220 is configured to convert a bit stream transmitted from the base station 110 to another node, for example, another access node, another base station, a higher node, a core network, and the like, into a physical signal, and is configured to convert a physical signal received from another node into a bit stream.

The storage unit 230 is configured to store data, such as a basic program for operation of the base station 110, an application program, and configuration information. The storage unit 230 may be implemented by a volatile memory, a non-volatile memory, or a combination of a volatile memory and a non-volatile memory. Also, the storage unit 230 is configured to provide stored data in response to a request of the controller 240.

The controller 240 is configured to control an overall operation of the base station 110. For example, the controller 240 is configured to transmit and receive signals through the wireless communication unit 210 or through the backhaul communication unit 220. Also, the controller 240 is configured to record data in the storage unit 230 and read the recorded data therefrom. Further, the controller 240 may be configured to perform functions of a protocol stack required by the communication standard. To this end, the controller 240 may include at least one processor. According to various embodiments, the controller 240 may be configured to control the base station 110 to perform operations according to various embodiments described below.

Figure 3:
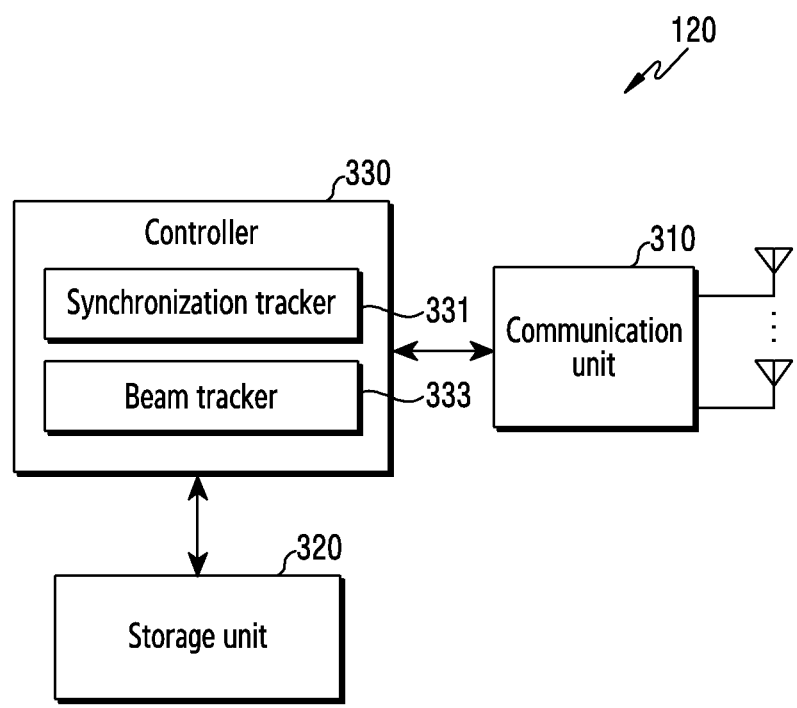
FIG. 3 is a block diagram illustrating an example of a configuration of a terminal in a wireless communication system according to various embodiments of the disclosure.

FIG. 3 is a block diagram illustrating an example of a configuration of a terminal in a wireless communication system according to various embodiments of the disclosure.

The configuration illustrated in FIG. 3 may be understood as a configuration of the terminal 120. The term " . . . unit," the term ending with the suffix " . . . or" or " . . . er," or the like, which is used below, may signify a unit of processing at least one function or operation, and this configuration may be implemented in hardware, software, or as a combination of hardware and software.

Referring to FIG. 3, the terminal 120 includes a communication unit 310, a storage unit 320, and a controller 330.

The communication unit 310 is configured to perform functions for transmitting or receiving a signal through a wireless channel. For example, the communication unit 310 is configured to perform a function of conversion between a baseband signal and a bit stream according to a physical layer standard of the system. For example, the communication unit 310 is configured to, when data is transmitted, generate complex symbols by encoding and modulating a transmission bit stream. Also, the communication unit 310 is configured to, when data is received, restore a reception bit stream by demodulating and decoding a baseband signal. Further, the communication unit 310 is configured to up-convert a baseband signal into an RF band signal and then transmit the RF band signal through an antenna, and is configured to down-convert an RF band signal received through the antenna into a baseband signal. For example, the communication unit 310 may include a transmission filter, a reception filter, an amplifier, a mixer, an oscillator, a DAC, an ADC, and the like.

Also, the communication unit 310 may include multiple transmission/reception paths. Further, the communication unit 310 may include at least one antenna array including multiple antenna elements. In terms of hardware, the communication unit 310 may include a digital circuitry and an analog circuitry (e.g., a radio frequency integrated circuit (RFIC)). In this example, the digital circuitry and the analog circuitry may be implemented as one package. Also, the communication unit 310 may include multiple RF chains. The communication unit 310 may perform beamforming. Further, in order to assign directivity, which depends on a configuration by the controller 330, to a signal to be transmitted or received, the communication unit 310 may apply a beamforming weight to the signal. According to an embodiment, the communication unit 310 may include an RF block. The RF block may include a first RF circuitry related to an antenna and a second RF circuitry related to baseband processing. The first RF circuitry may be referred to as an "RF-antenna (A)." The second RF circuitry may be referred to as an "RF-baseband(B)."

Also, the communication unit 310 may transmit or receive a signal. The communication unit 310 may receive a DL signal. A DL signal may include a synchronization signal, a reference signal, system information, a configuration message, control information, DL data, or the like. Also, the communication unit 310 may transmit an UL signal. An UL signal may include a random access-related signal, a reference signal (e.g., a sounding reference signal (SRS) or a demodulation RS (DM-RS)), UL data, or the like. Also, the communication unit 310 may include different communication modules configured to process signals in different frequency bands. Further, the communication unit 310 may include multiple communication modules configured to support multiple different radio access technologies. For example, different radio access technologies may include Bluetooth low energy (BLE), Wi-Fi, Wi-Fi Gigabyte (Wi-Gig), a cellular network (e.g., a long-term evolution (LTE) network or a new radio (NR) network), and the like. Also, different frequency bands may include a super-high frequency (SHF) (e.g., 2.5 GHz or 5 GHz) band, a mmWave (e.g., 38 GHz or 60 GHz) band, and the like.

As described above, the communication unit 310 transmits and receives signals. Accordingly, the entirety or part of the communication unit 310 may be referred to as a "transmitter," a "receiver," or a "transceiver." Also, in the following description, transmission and reception performed through a wireless channel has a meaning including the execution of the above-described processing by the communication unit 310.

The storage unit 320 is configured to store data, such as a basic program for operation of the terminal 120, an application program, and configuration information. The storage unit 320 may be implemented by a volatile memory, a non-volatile memory, or a combination of a volatile memory and a non-volatile memory. Also, the storage unit 320 is configured to provide stored data in response to a request of the controller 330. According to various embodiments, the storage unit 320 may be configured to store beam information. Beam information may include information for identification of a beam of the terminal. According to various embodiments, the storage unit 320 may be configured to store beam-specific channel information. For example, the terminal may be configured to, when a signal is received using a beam of the terminal, store a measurement result of the signal. Also, according to various embodiments, the storage unit 320 may be configured to store synchronization-related information of each of beams of the terminal.

The controller 330 is configured to control an overall operation of the terminal 120. For example, the controller 330 is configured to transmit and receive signals through the communication unit 310. Also, the controller 330 is configured to record data in the storage unit 320 and read the recorded data therefrom. Further, the controller 330 may be configured to perform functions of a protocol stack required by the communication standard. To this end, the controller 330 may include at least one processor or a microprocessor, or may be part of a processor. In addition, the controller 330 and a part of the communication unit 310 may be referred to as a "communication processor (CP)." The controller 330 may include various modules configured to perform communication.

According to various embodiments, the controller 330 may include a synchronization tracker 331 and a beam tracker 333. The synchronization tracker 331 may be configured to acquire synchronization and manage synchronization by correcting an error having occurred. According to some embodiments, the synchronization tracker 331 may further include a monitoring unit configured to check an error which occurs when synchronization is acquired for each beam and a filter configured to control interference to with a neighboring cell. The beam tracker 333 may be configured to change beams so as to measure channel qualities of the respective beams, and determine an optimal beam based on the channel qualities. In this example, each of the synchronization tracker 331 and the beam tracker 333 is an instruction set or codes stored in the storage unit 320, and may be instructions/codes or a storage space storing the instructions/codes, which are, at least temporarily, resided in the controller 330, or may be a part of a circuitry constituting the controller 330 or a module configured to perform functions of the controller 330. According to various embodiments, the controller 330 may be configured to control the terminal to perform operations according to various embodiments described below.

The configuration of the terminal illustrated in FIG. 3 is only an example of a terminal, and thus the disclosure is not limited thereto. That is, according to various embodiments, some elements of the terminal may be added, deleted, or modified.

Figure 4A:
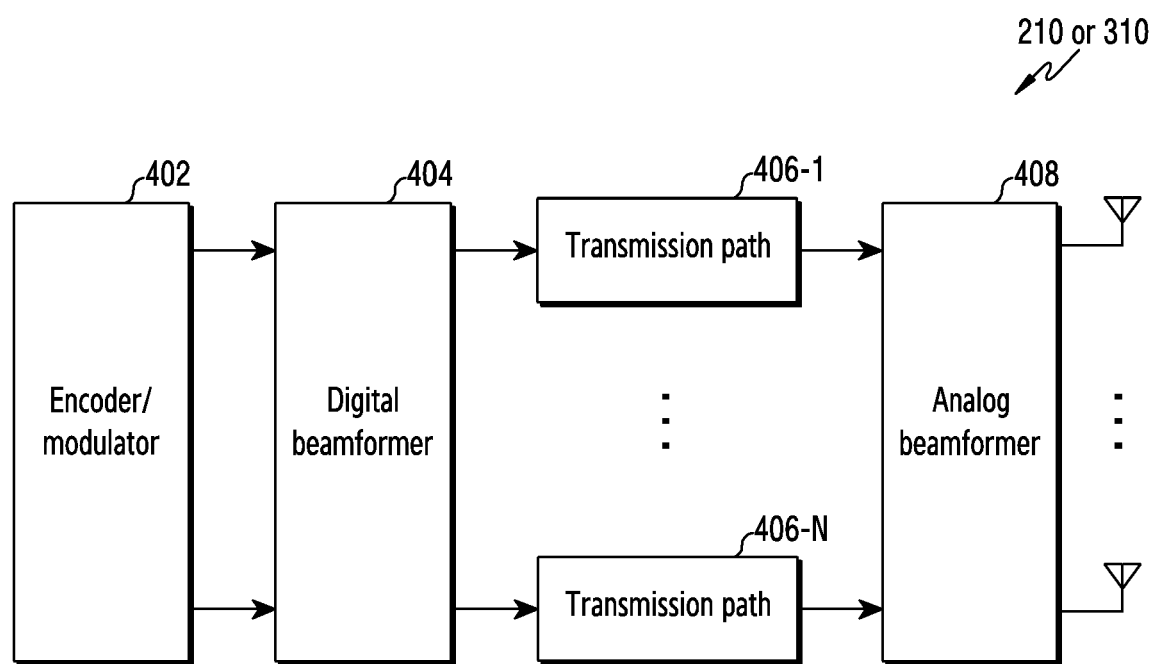
FIG. 4A is a block diagram illustrating a configuration of a communication unit in a wireless communication system according to various embodiments of the disclosure.

FIG. 4A is a block diagram illustrating a configuration of a communication unit in a wireless communication system according to various embodiments of the disclosure.

Figure 4B:
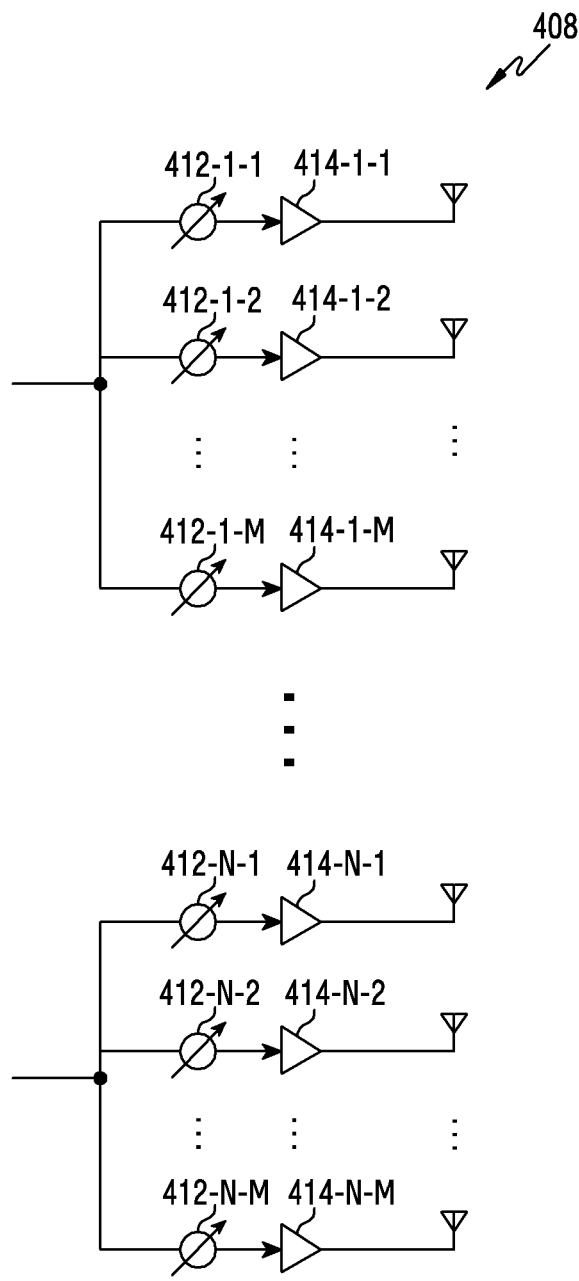
FIG. 4B is a block diagram illustrating a configuration of a communication unit in a wireless communication system according to various embodiments of the disclosure.

FIG. 4B is a block diagram illustrating a configuration of a communication unit in a wireless communication system according to various embodiments of the disclosure.

Figure 4C:
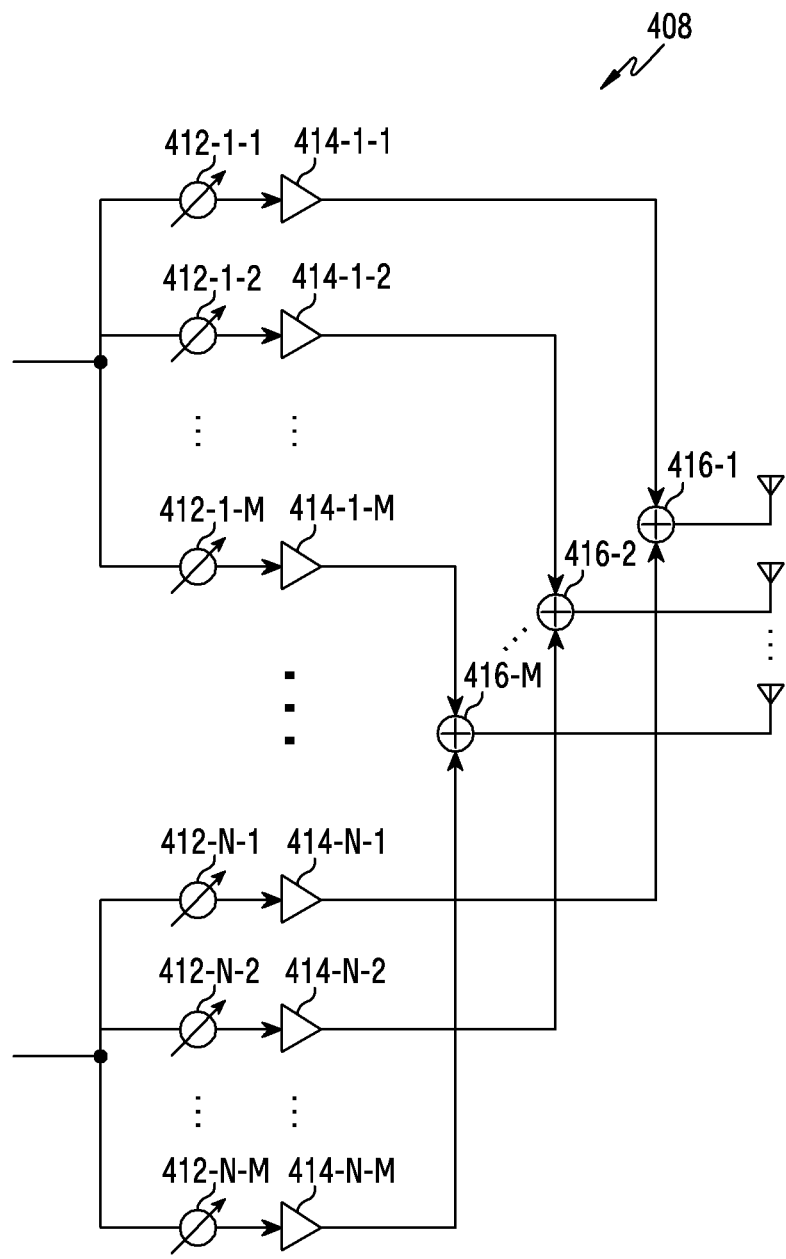
FIG. 4C is a block diagram illustrating a configuration of a communication unit in a wireless communication system according to various embodiments of the disclosure.

FIG. 4C is a block diagram illustrating a configuration of a communication unit in a wireless communication system according to various embodiments of the disclosure.

FIG. 4A illustrates an example of a specific configuration of the wireless communication unit 210 of FIG. 2 or the communication unit 310 of FIG. 3.

FIG. 4B illustrates an example of a specific configuration of the wireless communication unit 210 of FIG. 2 or the communication unit 310 of FIG. 3.

FIG. 4C illustrates an example of a specific configuration of the wireless communication unit 210 of FIG. 2 or the communication unit 310 of FIG. 3.

Specifically, FIG. 4A illustrates a part of the wireless communication unit 210 of FIG. 2 or the communication unit 310 of FIG. 3, and illustrates an example of elements configured to perform beamforming.

Specifically, FIG. 4B illustrates a part of the wireless communication unit 210 of FIG. 2 or the communication unit 310 of FIG. 3, and illustrates an example of elements configured to perform beamforming.

Specifically, FIG. 4C illustrates a part of the wireless communication unit 210 of FIG. 2 or the communication unit 310 of FIG. 3, and illustrates an example of elements configured to perform beamforming.

Referring to FIG. 4A, the wireless communication unit 210 or the communication unit 310 may include an encoder/modulator 402, a digital beamformer 404, multiple transmission paths 406-1 to 406-N, and an analog beamformer 408.

The encoder/modulator 402 is configured to perform channel encoding. For channel encoding, at least one of a low-density parity-check (LDPC) code, a convolution code, and a polar code may be used. The encoder/modulator 402 is configured to generate modulated symbols by performing constellation mapping.

The digital beamformer 404 is configured to perform beamforming on a digital signal (e.g., modulated symbols). To this end, the digital beamformer 404 is configured to multiply the modulated symbols by beamforming weights. In this example, the beamforming weights may be used to change the magnitude or the phase of a signal, and may be referred to as a "precoding matrix," "precoder," or the like. The digital beamformer 404 is configured to output digital-beamformed modulated symbols to the multiple transmission paths 406-1 to 406-N. In this example, according to a multiple-input multiple-output (MIMO) transmission technique, the modulated symbols may be multiplexed, or identical modulated symbols may be provided to the multiple transmission paths 406-1 to 406-N.

The multiple transmission paths 406-1 to 406-N are configured to convert the digital-beamformed digital signals into analog signals. To this end, each of the multiple transmission paths 406-1 to 406-N may include an inverse fast fourier transform (IFFT) calculator, a cyclic prefix (CP) inserter, a DAC, and an up-converter. The CP inserter may be used for an orthogonal frequency division multiplexing (OFDM) method, and may be excluded when another physical layer method (e.g., a filter bank multi-carrier (FBMC)) is applied. That is, the multiple transmission paths 406-1 to 406-N are configured to provide an independent signal processing process with respect to multiple streams generated by digital beamforming. However, according to an implementation method, some of the elements of the multiple transmission paths 406-1 to 406-N may be shared.

The analog beamformer 408 is configured to perform beamforming on an analogue signal. To this end, the digital beamformer 404 is configured to multiply analog signals by beamforming weights. In this example, the beamforming weights may be used to change the magnitude and the phase of a signal. Specifically, according to a connection structure between the multiple transmission paths 406-1 to 406-N and antennas, the analog beamformer 408 may be configured as illustrated in FIG. 4B or 4C.

Referring to FIG. 4B, signals input to the analog beamformer 408 pass through phase/magnitude conversion calculation and amplification calculation and are then transmitted through the antennas. In this example, signals along the respective paths are transmitted through different antenna sets, that is, antenna arrays. Processing of a signal input through the first path is described. The signal is converted into a signal sequence having different or identical phase/magnitude by phase/magnitude converters 412-1-1, 412-1-2, ..., 412-1-M, the signal sequence is amplified by amplifiers 414-1-1, 414-1-2, ..., 414-1-M, and then the amplified signal sequence is transmitted through the antennas. A signal through each of the paths 406-1 ... 406-N would be processed similarly, through via phase/magnitude converters 412-1-1, 412-1-2, ..., 412-N-1, 412-N-2, ..., 412-N-M and amplifiers 414-1-1, 414-1-2, ..., 414-N-1, 414-N-2, ..., 414-N-M.

Referring to FIG. 4C, signals input to the analog beamformer 408 pass through phase/magnitude conversion calculation and amplification calculation and are then transmitted through the antennas. In this example, signals along the respective paths are transmitted through an identical antenna set, that is, an antenna array. Processing of a signal input through the first path is described. The signal is converted into a signal sequence having different or identical phase/magnitude by phase/magnitude converters 412-1-1 to 412-1-M, and the signal sequence is amplified by amplifiers 414-1-1 to 414-1-M. Then, so that the amplified signals are transmitted through one antenna array, the amplified signals are added by adders 416-1, 416-2, ..., 416-M with reference to an antenna element, and then the added signals are transmitted through the antennas.

FIG. 4B illustrates an example of using an independent antenna array for each transmission path, and FIG. 4C illustrates an example of sharing of one antenna array by transmission paths. However, according to another embodiment, some transmission paths may use independent antenna arrays and the remaining transmission paths may share one antenna array. Further, according to still another embodiment, a switchable structure is applied between transmission paths and antenna arrays, so that it is possible to use a structure adaptively changeable according to the circumstances.

In order to communicate with the base station, the terminal is required to acquire synchronization. Hereinafter, in the disclosure, acquisition of synchronization implies that the terminal acquires information on a resource structure (e.g., a boundary between subframes, slots, symbols, resource blocks, or frequencies) with the base station within a predetermined error range. Out-of-synchronization implies that the difference between the information on the resource structure acquired by the terminal and information on an actual resource structure of the base station is outside a predetermined error range. In some embodiments, when the synchronization information is acquired, the terminal is further configured to acquire information on a resource structure with a base station within a predetermined error range.

In order not to lose the acquired synchronization, the terminal may continuously track synchronization. In a beamforming communication system, due to the directivity of a beam, synchronizations may be different according to beams. The terminal is required to track synchronization of the beam of the terminal used when synchronization is acquired.

The terminal may move, tilt, or rotate. Also, in a wireless channel environment between the terminal and the base station, a new obstacle may appear or topography may change. Due to this channel change, an optimal beam appropriate for execution of communication is not fixed. In order to continuously update to a beam appropriate for communication, the terminal is required to continuously measure qualities of beams.

When the terminal schedules beams thereof in order to perform beam tracking, the number of times of scheduling of a serving beam may be relatively reduced. As the number of times of scheduling of a serving beam is reduced, the opportunity for synchronization tracking using the serving beam may be reduced. When the opportunity for synchronization tracking using the serving beam is reduced, out-of-synchronization may be caused. In contrast, when the number of times of scheduling of the serving beam is exceedingly increased, the opportunity for measuring qualities of neighboring beams is relatively reduced, and thus the degradation of communication quality may be caused.

In order to solve the above-mentioned problems, a terminal according to various embodiments performs operations for interworking between synchronization tracking and beam tracking. In the disclosure, a description will be made of a method for combining synchronization tracking and beam tracking and performing the combined synchronization tracking and beam tracking and thus enabling a reduction in a synchronization failure rate and smooth identification of an optimal beam.

For convenience of description, a beam tracking procedure using DL signals to a terminal from a base station will be described by way of example, but the disclosure is not limited thereto. In other words, beam tracking according to the disclosure can be utilized for DL signals, UL signals, signals for device-to-device (D2D) communication (e.g., sidelink (SL)), and all other signals using beams.

Figure 5:
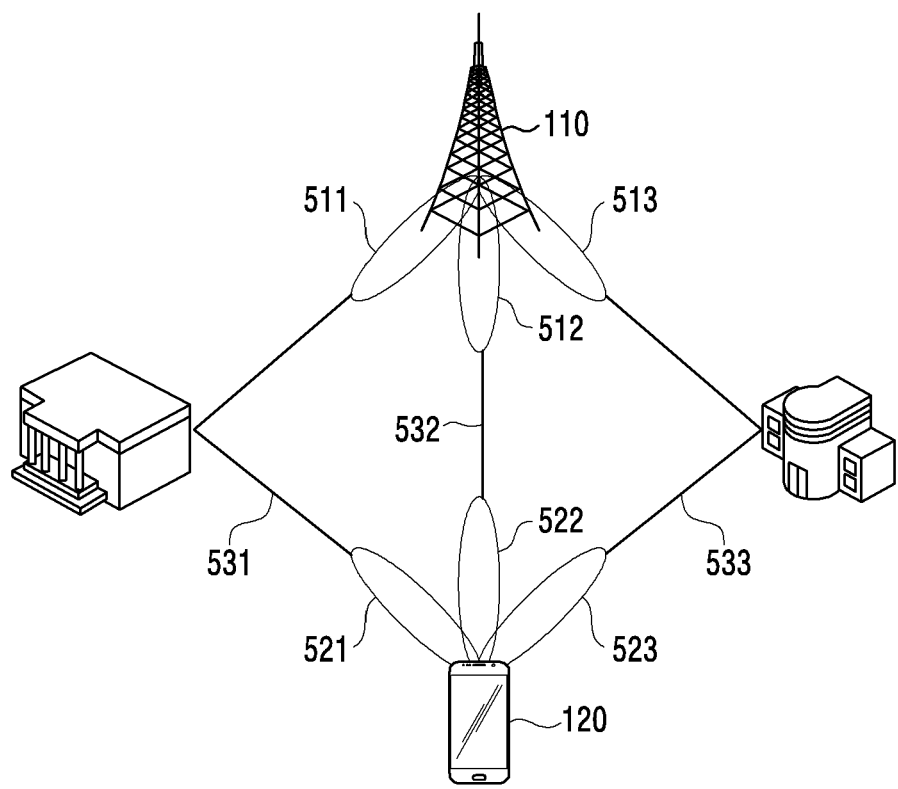
FIG. 5 illustrates an example of synchronization tracking and beam tracking according to various embodiments of the disclosure.
Figure 5:
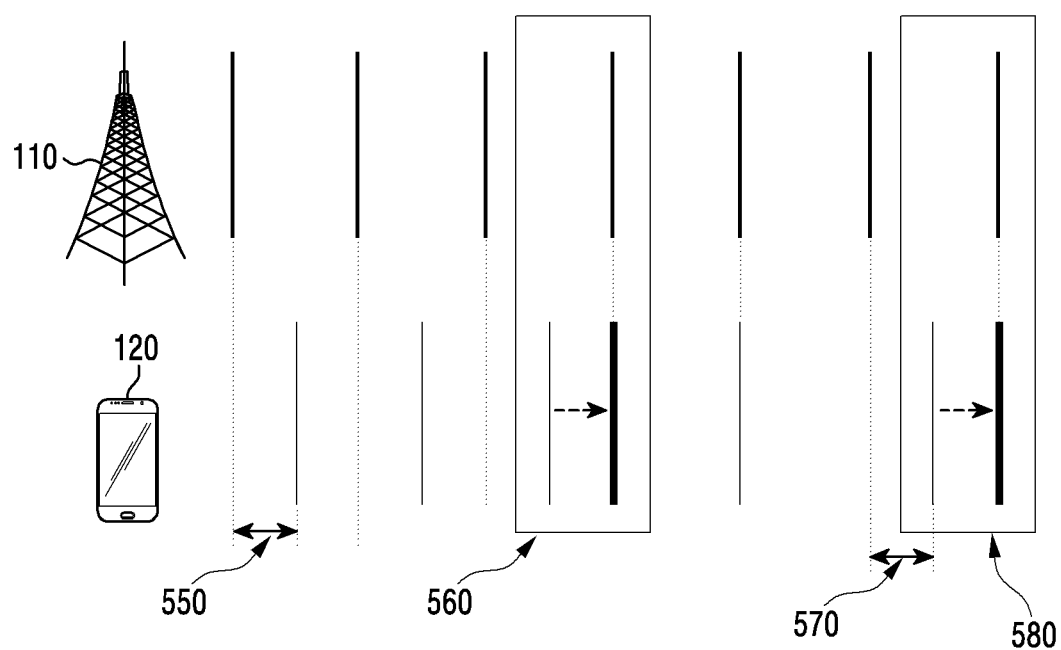

FIG. 5 illustrates an example of synchronization tracking and beam tracking according to various embodiments of the disclosure.

Hereinafter, in FIG. 5, terms and configurations required to describe synchronization tracking and beam tracking according to the disclosure will be defined. However, it goes without saying that the disclosure is not limited to the terms defined in FIG. 5 and other terms having equivalent technical meanings may be used. Also, in FIG. 5, in order to describe beam tracking, a situation in which a base station and a terminal both have three beams in the DL will be described by way of example. A base station may be the base station 110 of FIG. 1. A terminal may be the terminal 120 of FIG. 1.

Referring to FIG. 5, the terminal 120 may perform beamforming communication with the base station 110. An example of DL will be described. The base station 110 may transmit signals by using multiple beams (e.g., a first transmission beam 511, a second transmission beam 512, and a third transmission beam 513) in order to identify an optimal beam of the base station 110. The terminal 120 may receive signals by using multiple beams (e.g., a first reception beam 521, a second reception beam 522, and a third reception beam 523) in order to identify an optimal beam of the terminal 120. Hereinafter, a procedure for transmitting or receiving a signal while changing a beam may be referred to as "beam tracking," "beam search," "direction search," "direction sweeping," or "direction training."

The base station 110 may acquire channel qualities of the beams of the base station 110, and may identify an optimal transmission beam. The terminal 120 may acquire channel qualities of the beams of the terminal 120, and may identify an optimal reception beam. The channel quality of a beam signifies the channel quality of a signal transmitted or received using a beam.

In the disclosure, a signal transmitted or received using a beam may be a synchronization signal or a reference signal. For example, a synchronization signal may include at least one of a primary SS (PSS), a secondary SS (SSS), an extended SS (ESS), and an SS block. Also, for example, a reference signal may include at least one of a beam RS (BRS), a beam refinement RS (BRRS), a cell-specific RS (CRS), a channel state information-RS (CSI-RS), and a DM-RS.

In the disclosure, channel quality may be at least one of, for example, beam reference signal received power (BRSRP), reference signal received power (RSRP), reference signal received quality (RSRQ), received signal strength indicator (RSRI), signal to interference and noise ratio (SINR), carrier to interference and NR (CINR), signal to NR (SNR), error vector magnitude (EVM), bit error rate (BER), and block error rate (BLER). It goes without saying that, besides the above-described example, other terms having equivalent technical meanings or other metrics indicating channel quality may be used. Hereinafter, in the disclosure, high channel quality signifies a case in which a signal magnitude-related channel quality value is large or an error rate-related channel quality value is small. High channel quality may signify that a smooth wireless communication environment is ensured as channel quality becomes higher. Also, an optimal beam may signify a beam having the highest channel quality among beams.

The base station 110 may identify the second transmission beam 512 as an optimal DL transmission beam. The terminal 120 may identify the second reception beam 522 as an optimal DL reception beam. The terminal 120 may acquire synchronization for a second link 532 formed by the second transmission beam 512 and the second reception beam 522.

The terminal 120 may acquire an offset 550 which is a difference between a reference time and a cell time of the terminal 120. A reference time signifies a reference of an actual cell time of the base station 110. That is, the offset 550 signifies a time difference between the base station 110 and the terminal 120 which is caused by a physical distance therebetween. The term "offset" may be referred to as a "clock skew." The terminal 120 may acquire initial synchronization with the base station 110 by applying the offset 550 to a subsequently-acquired cell time of the terminal 120 (as indicated by reference numeral 560).

Even when the offset 550 is applied, subsequently-acquired synchronization may be different from the initial synchronization, due to the performance of hardware (e.g., a timer) of the terminal 120, a state change (e.g., temperature, time, or pressure) of the terminal 120, and the like. For example, an oscillator configured to generate a clock is slightly affected by a state change, such as temperature or pressure, and thus an error between synchronizations may occur. In order to track synchronization, the terminal 120 may determine a synchronization variance which is a difference between subsequently-acquired synchronization and previous synchronization. The term "synchronization variance" may be referred to as a "clock drift," a "synchronization error," a "synchronization deviation," or the like.

The terminal 120 may update synchronization information (e.g., an offset, an expected cell time, and a synchronization range) (as indicated by reference numeral 570) by applying the synchronization variance in a subsequently-acquired cell time of the terminal 120 (as indicated by reference numeral 580). A procedure for updating synchronization information so as to prevent the occurrence of failure of synchronization with the base station 110 is referred to as a "synchronization tracking procedure." The terminal 120 may update synchronization information so that the acquired cell time can be located in a synchronization range. The term "synchronization range" refers to an effective range of a cell time used for the terminal 120 to identify whether synchronization with the base station 110 fails. The length of a synchronization range may be configured according to the length of a CP or the performance of a synchronization timer of the terminal 120.

According to a change in a physical path, a propagation time of a signal also changes. Synchronization is changed according to a propagation time of a signal, and thus may be dependent on a physical path. In order to track the acquired synchronization, the terminal 120 may schedule the second reception beam 522 which is a serving beam.

When the terminal 120 moves or rotates, due to the directivity property of beamforming communication, an optimal beam-pair link between the base station 110 and the terminal 120 may be changed from the second link 532 to another link (e.g., a first link 531 or a third link 533). Also, when a moving object enters the second link 532 or a wireless channel between the base station 110 and the terminal 120 is changed, the second link 532 may no longer be an optimal beam-pair link between the base station 110 and the terminal 120. In consideration of the mobility of the terminal 120 or a channel change, the base station 110 or the terminal 120 is required to transmit or receive a signal while continuously changing a beam.

The terminal 120 may receive a first signal by using the first reception beam 521. The terminal 120 may schedule the first reception beam 521 during a first interval in which the terminal 120 receives the first signal. The terminal 120 may receive a second signal by using the second reception beam 522. The terminal 120 may schedule the second reception beam 522 during a second interval in which the terminal 120 receives the second signal. The terminal 120 may receive a third signal by using the third reception beam 523. The terminal 120 may schedule the third reception beam 523 during a third interval in which the terminal 120 receives the third signal.

When the terminal 120 fairly schedules all of the beams of the terminal 120, the number of times of scheduling of a serving beam (e.g., the second reception beam 522) may be relatively reduced. As the number of times of scheduling of the serving beam is reduced, the opportunity for synchronization tracking on a path of the serving beam is reduced, and thus the probability of out-of-synchronization may increase. In contrast, when the terminal 120 relatively frequently schedules a serving beam in order to perform synchronization tracking, the opportunity for measuring qualities of neighboring beams (e.g., the first reception beam 521 and the third reception beam 523) other than the serving beam is reduced, and thus it is difficult to instantaneously reflect a change in a channel state. Accordingly, in order to efficiently solve the above-described problems, the terminal 120 is required to schedule a beam by considering synchronization tracking and beam tracking together.

The terminal 120 may perform operations for interworking between beam-based synchronization tracking and beam tracking. The terminal 120 may perform synchronization while performing beam tracking. Hereinafter, in the disclosure, a cycle, in which beam tracking of all beams is performed to update a serving beam, may be referred to as a "beamforming interval," an "interworking interval," or the like. Hereinafter, operations of a terminal for interworking between synchronization tracking and beam tracking will be described with reference to FIGS. 6 to 12, 13A, 13B, 13C, 14, 15A, 15B, 15C, 16, and 17.

Figure 6:
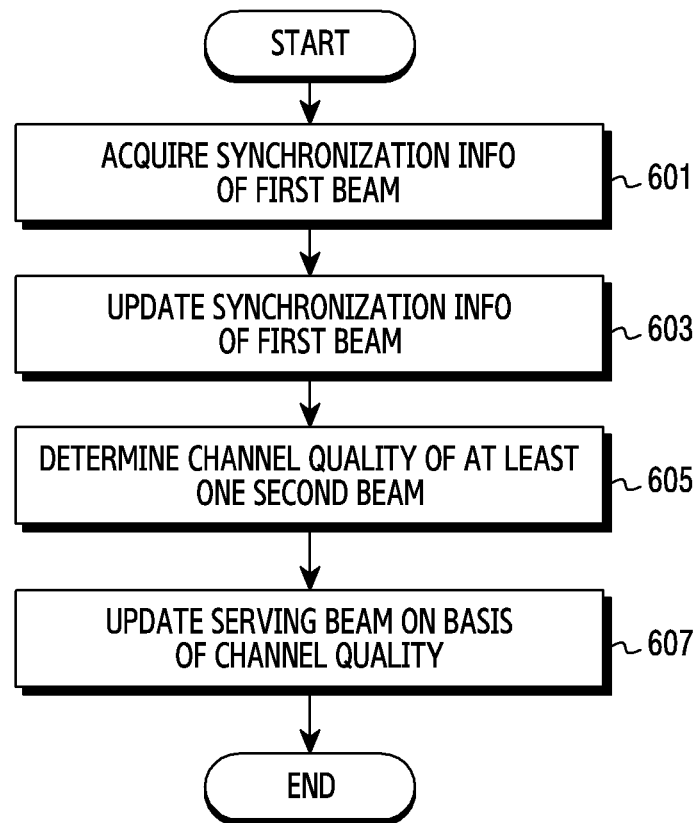
FIG. 6 is a flowchart illustrating an operation of a terminal for interworking between synchronization tracking and beam tracking according to various embodiments of the disclosure.

FIG. 6 is a flowchart illustrating an operation of a terminal for interworking between synchronization tracking and beam tracking according to various embodiments of the disclosure. FIG. 6 illustrates an example of an operating method of the terminal 120.

Referring to FIG. 6, in operation 601, the terminal may acquire synchronization information of a first beam. The first beam may be a serving beam. The term "serving beam" refers to the most appropriate beam for communication with a base station among beams of the terminal or a beam which is currently being used to communicate with the base station thereamong. The terminal may identify a serving beam based on the channel quality of each of beams of the terminal. Synchronization information may be parameters for determination of successful synchronization between the base station and the terminal. For example, synchronization information may be a cell time. Also, for example, synchronization information may be an offset of a cell time. The terminal may acquire initial synchronization to a relevant cell based on synchronization signals received from the base station. In a beamforming communication system, the terminal communicates with the base station by using the serving beam, and thus may acquire initial synchronization of the serving beam.

In operation 603, the terminal may update the synchronization information of the first beam. In this example, the update of synchronization information signifies synchronization tracking. The terminal may track a synchronization variance which occurs due to a channel change or the performance of the terminal itself. The terminal may determine a synchronization variance whenever performing synchronization tracking. The terminal may determine a synchronization variance based on previous synchronization information and synchronization information acquired at the current stage. For example, the terminal may determine a difference between a previous cell time of a beam and a current cell time of the beam. The terminal may determine the difference between the cell times as a synchronization variance. The terminal may compensate for a cell time offset (CTO) by the synchronization variance. The terminal may update a synchronization range by using the compensated offset. That is, the terminal may determine a synchronization range by using the synchronization variance so as to maintain synchronization with the base station.

According to various embodiments, the terminal may update the synchronization information of the serving beam. A propagation time of a signal is changed according to a physical path along which a signal is transmitted between the base station and the terminal, and thus synchronization is dependent on the physical path. The terminal performs wireless communication along a path formed through the serving beam and may update the synchronization information of the serving beam. In some embodiments, the terminal may update synchronization information by using a serving beam. For example, the terminal may update the acquired synchronization information based on the first beam. In order to update synchronization information, the terminal may schedule the first beam which is a serving beam. The terminal may acquire a synchronization variance of the first beam by receiving a signal by using the first beam. The terminal may update synchronization information based on the synchronization variance of the serving beam.

In some other embodiments, the terminal may update synchronization information by using a neighboring beam as well as a serving beam. For example, the terminal may acquire a value of a synchronization variance of the second beam by receiving a signal by using a second beam which is a neighboring beam. The terminal may acquire a value of a synchronization variance according to the difference between synchronization information of the second beam, acquired during a previous beam training interval, and the synchronization information of the second beam acquired in operation 603. The terminal may update the synchronization of the first beam, which is s serving beam, based on the synchronization variance of the second beam which is a neighboring beam.

In operation 605, the terminal may determine channel quality of at least one second beam. The at least one second beam may be a beam different from the first beam in operation 601. The at least one second beam may be a neighboring beam. The terminal may determine channel qualities of signals received using neighboring beams.

According to various embodiments, the terminal may determine at least one channel quality based on synchronization information updated in operation 603. Signals used to determine channel quality may be signals transmitted by the base station. In order to compare channel quality of the at least one second beam with that of the serving beam, the terminal may be required to receive signals in a state where synchronization with the base station is acquired. The terminal may receive signals based on the latest synchronization information. For example, the base station may periodically transmit BRSs. The terminal may determine channel quality of each of the at least one second beam by receiving BRSs by using each of the at least one second beam. That is, the terminal may perform a procedure for receiving signals by using neighboring beams and determining channel qualities, that is, a beam tracking procedure.

According to various embodiments, the terminal may configure the number of the at least one second beam. For example, the terminal may determine the number of the at least one second beam to be a fixed number (e.g., 3). The terminal may schedule three beams among the neighboring beams. As another example, the terminal may determine the number of the at least one second beam to be a variable number. The terminal may adaptively determine the number of the at least one second beam among the neighboring beams based on a channel change. In some embodiments, the number of the at least one second beam to be variably is determined based on a channel change.

In operation 607, the terminal may update the serving beam based on the channel quality. The terminal may determine channel quality of the first beam. As an example, the terminal may determine channel quality of the first beam when receiving a signal in order to update synchronization information in operation 603. As another example, the terminal may determine channel quality by additionally receiving a signal by using the first beam.

The terminal may determine channel qualities of neighboring beams. The channel qualities of the neighboring beams may include the channel quality of the at least one second beam in operation 605. According to an embodiment, the terminal may additionally receive a signal by using another neighboring beam as well as the at least one second beam, and may determine channel quality of the signal.

According to various embodiments, the terminal may update a serving beam based on channel quality of the serving beam and channel qualities of neighboring beams. For example, the terminal may determine, as a serving beam, one of neighboring beams having channel qualities higher than that of the first beam which is a current serving beam. The terminal may change a serving beam from the first beam to one of the neighboring beams. As another example, the terminal may determine channel quality of the first beam to be higher than channel qualities of all the neighboring beams. The terminal may maintain a serving beam as the first beam.

According to various embodiments, the terminal may update a serving beam based on channel quality of the first beam and channel quality of the at least one second beam. The terminal may also update a serving beam by comparing channel quality of the first beam with channel quality of the at least one second beam which is some beams rather than all the neighboring beams of the terminal. The terminal updates a serving beam is updated before determining channel qualities of all the beams for beam tracking, and thus can adapt more quickly to a channel.

Although not illustrated in FIG. 6, according to various embodiments, the terminal may repeatedly and additionally perform a synchronization tracking procedure in operation 603 and a beam tracking procedure in operation 605. Also, the terminal may repeatedly perform operation 605 until channel qualities of all the neighboring beams are determined. Such a repeated procedure will be described below in detail with reference to FIGS. 7 to 12, 13A, 13B, 13C, 14, 15A, 15B, 15C, and 16.

Figure 7:
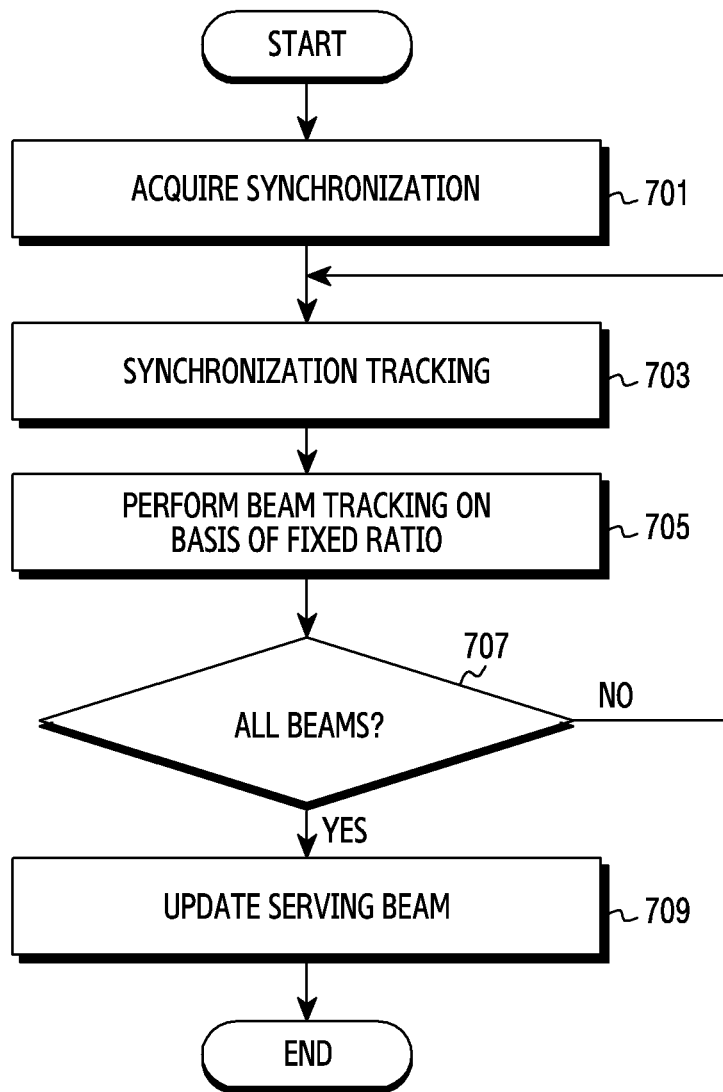
FIG. 7 is a flowchart illustrating an operation of a terminal for fixed interworking between serving-beam-based synchronization tracking and beam tracking according to various embodiments of the disclosure.
Figure 8:
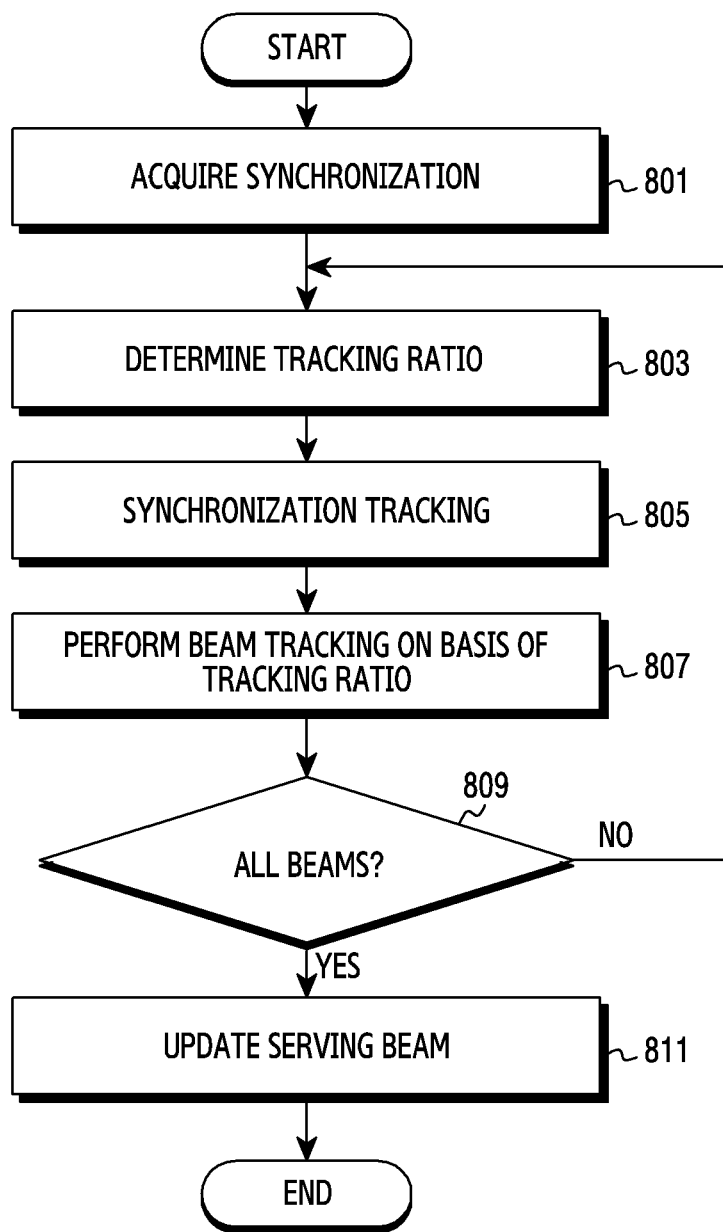
FIG. 8 is a flowchart illustrating an operation of a terminal for adaptive interworking between serving-beam-based synchronization tracking and beam tracking according to various embodiments of the disclosure.
Figure 9:
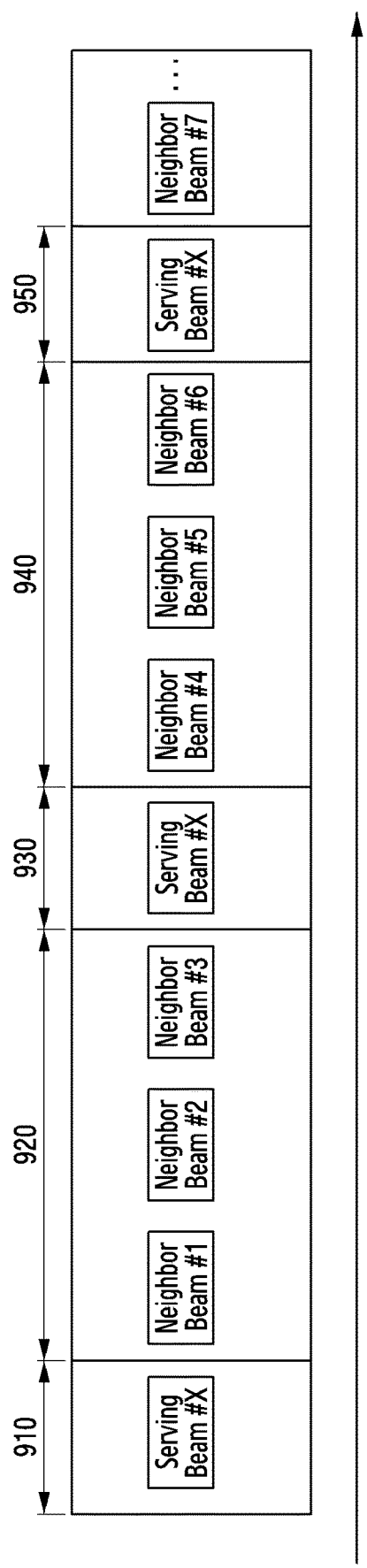
FIG. 9 illustrates an example of fixed interworking between serving-beam-based synchronization tracking and beam tracking according to various embodiments of the disclosure.

The terminal performs beam tracking after synchronization tracking, and thus can obtain a more accurate measurement result than in the case of beam tracking. Since a synchronization tracking result is reflected, the accuracy of measurement of a neighboring beam can be improved. When a serving beam is used during synchronization tracking and a neighboring beam is scheduled during beam tracking, a ratio of the number of beams scheduled during the synchronization tracking to that of beams scheduled during the beam tracking may affect communication performance. Hereinafter, FIG. 7 illustrates the flow of an operation of a terminal for performing interworking between synchronization tracking and beam tracking by controlling a ratio of a serving beam (e.g., a first beam) scheduled during the synchronization tracking to neighboring beams (e.g., at least one second beam) used during the beam tracking. FIG. 8 illustrates the flow of an operation of a terminal for performing interworking between synchronization tracking and beam tracking by controlling a ratio of a serving beam (e.g., a first beam) scheduled during the synchronization tracking to neighboring beams (e.g., at least one second beam) used during the beam tracking. FIG. 9 illustrates the flow of an operation of a terminal for performing interworking between synchronization tracking and beam tracking by controlling a ratio of a serving beam (e.g., a first beam) scheduled during the synchronization tracking to neighboring beams (e.g., at least one second beam) used during the beam tracking.

Ratio-Based Interworking

FIG. 7 is a flowchart illustrating an operation of a terminal for fixed interworking between serving-beam-based synchronization tracking and beam tracking according to various embodiments of the disclosure. FIG. 7 illustrates an example of an operating method of the terminal 120.

Referring to FIG. 7, in operation 701, the terminal may acquire synchronization. The terminal may acquire synchronization of a serving beam. The terminal may receive a signal by using the serving beam and may acquire synchronization information of the received signal. The terminal may determine initial synchronization. Operation 701 corresponds to operation 601 of FIG. 6, and thus a detailed description of the overlapping configuration will be omitted.

In operation 703, the terminal may perform synchronization tracking. The terminal may perform synchronization tracking using the serving beam. Hereinafter, synchronization tracking performed using a serving beam may be referred to as "serving-beam-based synchronization tracking."

The terminal may schedule the serving beam. The terminal may receive a signal by using the scheduled serving beam. The terminal may receive a signal by using the scheduled serving beam so as to perform synchronization. The terminal may receive a signal so as to determine a cell time of the serving beam. The terminal may use the cell time to determine a synchronization variance of the initial synchronization acquired in operation 701. The terminal may compensate for the synchronization variance so as to perform serving-beam-based synchronization tracking. Also, when a cycle is repeated according to the determination in operation 707, the terminal may determine a synchronization variance of previous synchronization information (e.g., a cell time).

Hereinafter, for convenience of description, a time for which a serving beam is scheduled, that is, a time for which a signal is received using a serving beam, may be referred to as a "synchronization interval." According to an embodiment, a synchronization interval may have a length of 5 ms. A base station may configure the serving beam as a reception beam during a synchronization interval so as to receive synchronization signals.

In operation 705, the terminal may perform beam tracking based on a fixed ratio. The term "ratio" in fixed ratio may refer to the number of scheduled neighboring beams relative to a serving beam in one tracking cycle. The term "tracking cycle" refers to a cycle in which synchronization tracking is performed. A tracking cycle may include a synchronization interval. A tracking cycle may include a beam tracking interval as well as a synchronization interval. The terminal may schedule at least one neighboring beam during a beam tracking interval. The term "fixed ratio" refers to a fixed ratio of scheduling of neighboring beams relative to scheduling of a serving beam in each tracking cycle during multiple tracking cycles in which measurement of all the neighboring beams is to be performed. For example, a fixed ratio of 3 implies that three neighboring beams are scheduled when a serving beam is scheduled once.

According to various embodiments, a fixed ratio may be fixed according to the performance of hardware of the terminal or the design of the terminal. For example, a value of a fixed ratio may be determined according to an error range of a timer for synchronization tracking of the terminal. When an error range of the timer is in a designated range, a value of a fixed ratio may be determined as a value corresponding to the designated range.

According to various embodiments, a fixed ratio may be differently configured whenever a serving beam is updated. For example, a fixed ratio may be determined based on the number of beams operated for beam tracking. The number of beams operated for beam tracking may be differently configured in each serving beam updating cycle. As another example, a fixed ratio may be configured according to the degree (e.g., a synchronization variance or an offset) of synchronization tracking using a serving beam updated whenever the serving beam is updated.

The terminal may schedule neighboring beams in order so as to receive a signal by using a relevant beam. The terminal may determine channel quality of a scheduled beam by measuring quality of the received signal. The terminal may determine channel qualities of neighboring beams. For example, when a fixed ratio is 3, the terminal may determine channel qualities of three neighboring beams.

In operation 707, the terminal may determine whether beam tracking of all the beams has been performed. All the beams may include a serving beam and neighboring beams configured for beam tracking. A result of the beam tracking of the serving beam may be acquired by receiving a signal in operation 703. The terminal may determine whether a result of the beam tracking (e.g., channel quality) of each of neighboring beams has been acquired. When the beam tracking of all the beams has been performed, the terminal may perform operation 709. When there exists a beam of which beam tracking has not been performed, the terminal may again perform operation 703.

In operation 709, the terminal may update the serving beam. The terminal may determine whether there exists channel quality of a beam which is higher than the channel quality of the serving beam among the channel qualities of the neighboring beams. When there exists channel quality of a beam which is higher than the channel quality of the serving beam among the channel qualities of the neighboring beams, the terminal may determine the relevant beam as a serving beam. When there exists no channel quality of a beam which is higher than the channel quality of the serving beam among the channel qualities of the neighboring beams, the terminal may maintain the existing serving beam.

In FIG. 7, the terminal schedules the neighboring beams at the fixed ratio, and thus can previously perform scheduling of all the beams for performing beam tracking. The terminal determines channel quality and performs a storage operation according to the fixed ratio, and thus the complexity of calculation in the terminal can be reduced. In the case of a static or stable channel, an effect of interworking between synchronization tracking and beam tracking can be maximized through the fixed interworking described with reference to FIG. 7.

FIG. 8 is a flowchart illustrating an operation of a terminal for adaptive interworking between serving-beam-based synchronization tracking and beam tracking according to various embodiments of the disclosure. FIG. 8 illustrates an example of an operating method of the terminal 120.

Referring to FIG. 8, in operation 801, the terminal may acquire synchronization. Operation 801 corresponds to operation 701 of FIG. 7, and thus a detailed description of the overlapping configuration will be omitted.

In operation 803, the terminal may determine a tracking ratio. A tracking ratio has a meaning in contrast with that of a fixed ratio, and signifies a ratio of scheduling of neighboring beams relative to scheduling of a serving beam in one tracking cycle. That is, a tracking ratio signifies a ratio of beam tracking relative to synchronization tracking. In this example, a tracking ratio may be changed in each tracking cycle. The terminal may change a tracking ratio in each tracking cycle during multiple tracking cycles in which measurement of all the neighboring beams is performed. That is, the terminal may determine a tracking ratio whenever operation 803 is repeatedly performed according to the determination in operation 809.

During a first tracking cycle, the terminal may set a tracking ratio to a default value. As an example, a default value may be a constant, such as 3. As another example, a default value may be the value of a tracking ratio finally used when a previous reception beam is swept.

According to various embodiments, the terminal may determine a tracking ratio in each tracking cycle. The terminal may determine a tracking ratio based on information acquired in one tracking cycle. In some embodiments, the terminal may determine a tracking ratio based on a result of the synchronization tracking. For example, the terminal may determine a tracking ratio according to a value of a synchronization variance during synchronization tracking. When a synchronization variance is large, the synchronization variance exceeds a CP and the probability of out-of-synchronization becomes higher. Therefore, the terminal may reduce a tracking ratio. According to a reduction in a tracking ratio, a ratio of scheduling of a serving beam relative to scheduling of neighboring beams becomes higher, and thus the terminal can more accurately control synchronization.

In some embodiments, the terminal may determine a tracking ratio based on channel quality. The terminal may receive a signal by using a serving beam or a neighboring beam so as to determine channel quality of the serving beam. For example, in operation 805, when synchronization tracking is performed, the terminal may receive a signal by using a serving beam so as to determine RSRP of the serving beam. As a variance of channel quality becomes larger, a synchronization variance may increase. In this example, the terminal may increase a ratio of scheduling of a serving beam relative to scheduling of neighboring beams. According to an embodiment, a variance of channel quality may be measured through a neighboring beam as well as a serving beam. A serving beam and a neighboring beam are not identical to each other, but change trends of the serving beam and the neighboring beam adjacent to the serving beam may be similar to each other. Also, when channel quality of the serving beam is lower than or equal to a threshold, the terminal may be required to more quickly identify another optimal reception beam. In this example, the terminal may increase a ratio of scheduling of neighboring beams relative to scheduling of a serving beam.

In some other embodiments, the terminal may differently determine a tracking ratio according to the number of neighboring beams. The terminal may update a serving beam in each designated cycle. Accordingly, the terminal may determine a tracking ratio based on at least one of the number of neighboring beams which is measurable in a designated cycle, the number of all the neighboring beams configured for beam tracking, and the number of neighboring beams of which channel qualities are currently determined.

In addition, the terminal may combine at least two of different conditions for determination of the tracking ratio so as to determine a tracking ratio. For example, the terminal may determine a tracking ratio based on channel qualities of at least some of neighboring beams, and may determine a tracking ratio based on the number of some other beams and a remaining time in a designated cycle. As another example, the terminal may determine a tracking ratio based on channel quality and a synchronization variance.

In operation 805, the terminal may perform synchronization tracking. Operation 805 corresponds to operation 703 of FIG. 7, and thus a detailed description of the overlapping configuration will be omitted.

In operation 807, the terminal may perform beam tracking based on the tracking ratio. The terminal may perform beam tracking according to the tracking ratio determined in operation 803. For example, when the tracking ratio determined in operation 803 is 5, the terminal may schedule five neighboring beams. The terminal may perform beam tracking during a beam tracking interval according to the tracking ratio. A beam tracking interval may be different in each tracking cycle.

The terminal may schedule beams in order by the number of beams based on the tracking ratio so as to receive a signal by using each of the relevant beams. The terminal may measure quality of the received signal so as to determine channel quality of the scheduled beam. The terminal may determine channel qualities of neighboring beams. For example, when a tracking ratio is 5, the terminal may determine channel qualities of five neighboring beams.

In operation 809, the terminal may determine whether beam tracking of all the beams has been performed. Operation 809 corresponds to operation 707 of FIG. 7, and thus a detailed description of the overlapping configuration will be omitted. When the beam tracking of all the beams has been performed, the terminal may perform operation 811. When there exists a beam of which beam tracking has not been performed, the terminal may again perform operation 803.

In operation 811, the terminal may update the serving beam. Operation 811 corresponds to operation 709 of FIG. 7, and thus a detailed description of the overlapping configuration will be omitted.

Although a tracking ratio is illustrated in FIG. 8 as being determined before synchronization tracking, according to an embodiment, a tracking ratio may be determined after synchronization tracking. In other words, the terminal may perform operation 805 before operation 803. In this example, the terminal may determine a tracking ratio by using more accurate synchronization information.

In FIG. 8, differently from FIG. 7, the terminal may determine a tracking ratio in each tracking cycle and may control scheduling of neighboring beams for beam tracking according to the tracking ratio, so as to perform interworking between channel-based synchronization tracking and beam tracking. In a situation where a channel is suddenly changed or in the case of a channel on which a communication state is unstable, a terminal can maximize an effect of interworking between synchronization tracking and beam tracking through the adaptive interworking described with reference to FIG. 8.

FIG. 9 illustrates an example of fixed interworking between serving-beam-based synchronization tracking and beam tracking according to various embodiments of the disclosure. A time duplex division scheme will be described as example of beam scheduling for performing synchronization tracking and beam tracking.

Referring to FIG. 9, a terminal may perform synchronization tracking and beam tracking. A fixed ratio may be 3. The terminal may schedule beam #X, which is a serving beam, during a first synchronization interval 910. Consideration is given to a situation in which synchronization of beam #X has been acquired. The terminal may receive a signal by using beam #X during the first synchronization interval 910 so as to determine synchronization information (e.g., a cell time, an offset, and a synchronization range) of beam #X. The terminal may determine a synchronization variance based on previously-acquired synchronization information and the synchronization information acquired during the first synchronization interval 910. The terminal may compensate for a synchronization variance so as to update synchronization information during the first synchronization interval 910. For example, the terminal may update an offset of beam #X by applying a synchronization variance so that the offset thereof can coincide with a cell time acquired during initial synchronization. Thereafter, the terminal may switch a beam from the serving beam (beam #X) to a neighboring beam.

The terminal may sequentially schedule beam #1, beam #2, and beam #3, which are three neighboring beams, during a first beam tracking interval 920. The terminal may perform beam switching. The terminal may perform beam switching so as to sequentially form a beam in each measurement unit interval. The terminal may receive a signal by using each of the scheduled beams so as to determine channel quality of each of the scheduled beams. In order to update the serving beam, the terminal may store information on the determined channel qualities. The terminal may store information on the neighboring beams until beam tracking of all the beams is terminated.

The terminal may schedule beam #X, which is a serving beam, during a second synchronization interval 930. The terminal may update the synchronization information of beam #X in the first synchronization interval 910. For example, the terminal may again determine a value of a synchronization variance of beam #X during the second synchronization interval 930. The terminal may update the offset of beam #X according to the value of the synchronization variance of beam #X determined during the second synchronization interval 930. The terminal may sequentially schedule beam #4, beam #5, and beam #6, which are three neighboring beams, during a second beam tracking interval 940.

The terminal may again schedule beam #X, which is a serving beam, during a third synchronization interval 950. As described above, the terminal may perform synchronization tracking and beam tracking during a synchronization interval and a beam tracking interval for three neighboring beams which are repeated by turns, respectively. One synchronization interval and one beam tracking interval may be referred to as "one tracking cycle." Until the terminal performs beam tracking of all the beams, a tracking cycle may be repeated. For example, when the number of beams for beam tracking is 40 in total, the terminal may perform synchronization tracking and beam tracking during a total of 13 tracking cycles (40=3×13+1).

Interworking Between any-Beam-Based Synchronization Tracking and Beam Tracking

Figure 10:
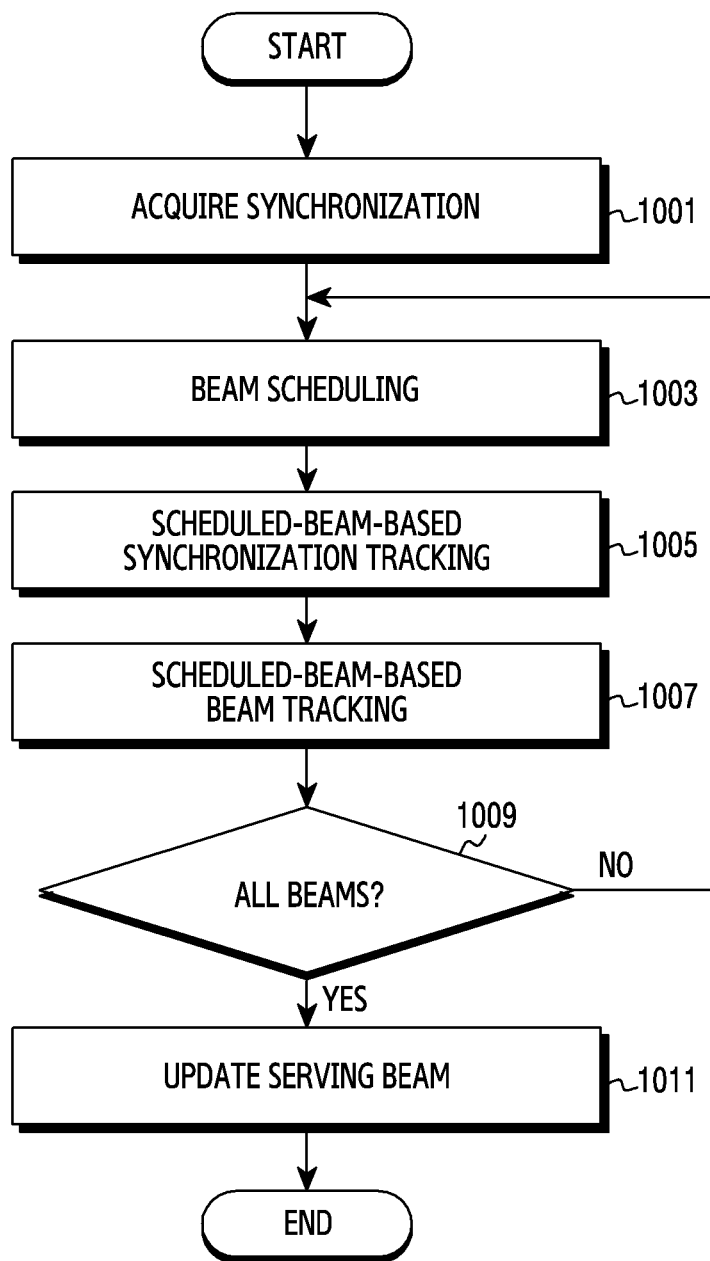
FIG. 10 is a flowchart illustrating an operation of a terminal for interworking between any-beam-based synchronization tracking and beam tracking according to various embodiments of the disclosure.

FIG. 10 is a flowchart illustrating an operation of a terminal for interworking between any-beam-based synchronization tracking and beam tracking according to various embodiments of the disclosure. FIG. 10 illustrates an example of an operating method of the terminal 120.

Referring to FIG. 10, in operation 1001, the terminal may acquire synchronization. Operation 1001 corresponds to operation 701 of FIG. 7, and thus a detailed description of the overlapping configuration will be omitted.

In operation 1003, the terminal may perform beam scheduling. The terminal may schedule one of beams thereof. In this example, beams of the terminal signify beams of the terminal for beam tracking. In order to repeatedly perform operations 1003 to 1005 according to operation 1009 described below, the terminal may sequentially schedule the beams. That is, differently from FIGS. 7, 8, and 9 in which a serving beam and neighboring beams are illustrated as being repeatedly switched in turn, the terminal may perform scheduling regardless of whether a currently-scheduled beam is a serving beam. That is, the terminal may schedule any beam.

The terminal may repeat beam scheduling by using various patterns. In some embodiments, the terminal may schedule a beam so as to perform beam sweeping according to a predefined pattern regardless of a serving beam. By using a predefined pattern, the complexity of calculation can be reduced. In some other embodiments, the terminal may first schedule a serving beam, and then may sequentially sweep neighboring beams in a subsequent repeated cycle. A serving beam is first scheduled, and thus the accuracy of synchronization tracking described below can be further improved.

In operation 1005, the terminal may perform scheduled-beam-based synchronization tracking. The terminal may receive a signal by using the beam scheduled (hereinafter "scheduled beam") in operation 1003. In this example, the scheduled beam is any beam and may be a serving beam or a neighboring beam. Scheduled-beam-based synchronization tracking may be referred to as "any-beam-based synchronization tracking."

The terminal may receive a signal by using the scheduled beam. The terminal may determine synchronization information of the received signal. The terminal may compare previous synchronization information of the relevant scheduled beam with the determined synchronization information thereof. The terminal may determine, as a synchronization variance, the difference between the previous synchronization information of the relevant scheduled beam and the determined synchronization information thereof. Such a synchronization variance may be caused by the state (e.g., temperature or pressure) of the terminal with the passage of time or the performance of the terminal (e.g., the reception performance of the terminal or the performance of a clock within the terminal). For a serving beam and a neighboring beam, absolute synchronizations are different due to a physical distance difference, but synchronization variances may be identical or similar to each other. Causes of a synchronization variance are not beam-specific. The terminal may update synchronization information of a serving beam based on the synchronization variance. Although the terminal does not necessarily schedule the serving beam, the terminal may acquire a synchronization change of a neighboring beam so as to update the synchronization information of the serving beam. In a first cycle, the terminal may compensate initial synchronization acquired in operation 1001 for a synchronization variance so as to update synchronization information. In a subsequent cycle, the terminal may compensate the synchronization information, updated in the previous cycle, for a synchronization variance so as to update synchronization information.

In some embodiments, the terminal may update synchronization information by using values of multiple synchronization variances. The terminal may determine an estimated value of a synchronization variance based on the synchronization variances obtained whenever a cycle is repeated. For example, the terminal may average synchronization variances so as to determine an estimated value of a synchronization variance. As another example, the terminal may apply weights of respective beams to average synchronization variances so as to determine an estimated value of a synchronization variance. A weight may be determined based on channel quality. The terminal may compensate for the estimated value of the synchronization variance so as to update synchronization information.

In some other embodiments, the terminal may not update synchronization information in at least one cycle. Whenever a cycle is repeated, the terminal may calculate synchronization variances. When the number of synchronization variances is larger than or equal to a predetermined value, the terminal may determine an estimated value of a synchronization variance based on the synchronization variances. The terminal can improve the reliability of synchronization tracking by considering multiple synchronization variances of multiple beams.

In operation 1007, the terminal may perform scheduled-beam-based beam tracking. The terminal may receive a signal by using the beam scheduled in operation 1003. The terminal may determine channel quality of the received signal. For example, the terminal may determine BRSRP. The terminal may determine channel quality as channel quality of the scheduled beam. According to various embodiments, the terminal may store information on channel quality of the scheduled beam (hereinafter "beam information"), for comparison with the channel quality determined in another cycle.

Operations 1003 to 1007 are repeated according to operation 1009 described below, and thus the terminal may determine channel qualities of all the beams for beam tracking. A scheme for scheduling any beam and sequentially performing synchronization tracking and beam tracking according to the scheduled beam as in operations 1003 to 1007 may be referred to as an "any-beam-based interworking procedure." The terminal may repeatedly perform an any-beam-based interworking procedure so as to determine channel qualities of all the beams for tracking.

In operation 1009, the terminal may determine whether beam tracking of all the beams has been performed. Operation 1009 corresponds to operation 707 of FIG. 7, and thus a detailed description of the overlapping configuration will be omitted. When the beam tracking of all the beams has been performed, the terminal may perform operation 1011. When there exists a beam of which beam tracking has not been performed, the terminal may again perform operation 1003.

In operation 1011, the terminal may update the serving beam. Operation 1011 corresponds to operation 709 of FIG. 7, and thus a detailed description of the overlapping configuration will be omitted.

Figure 11:
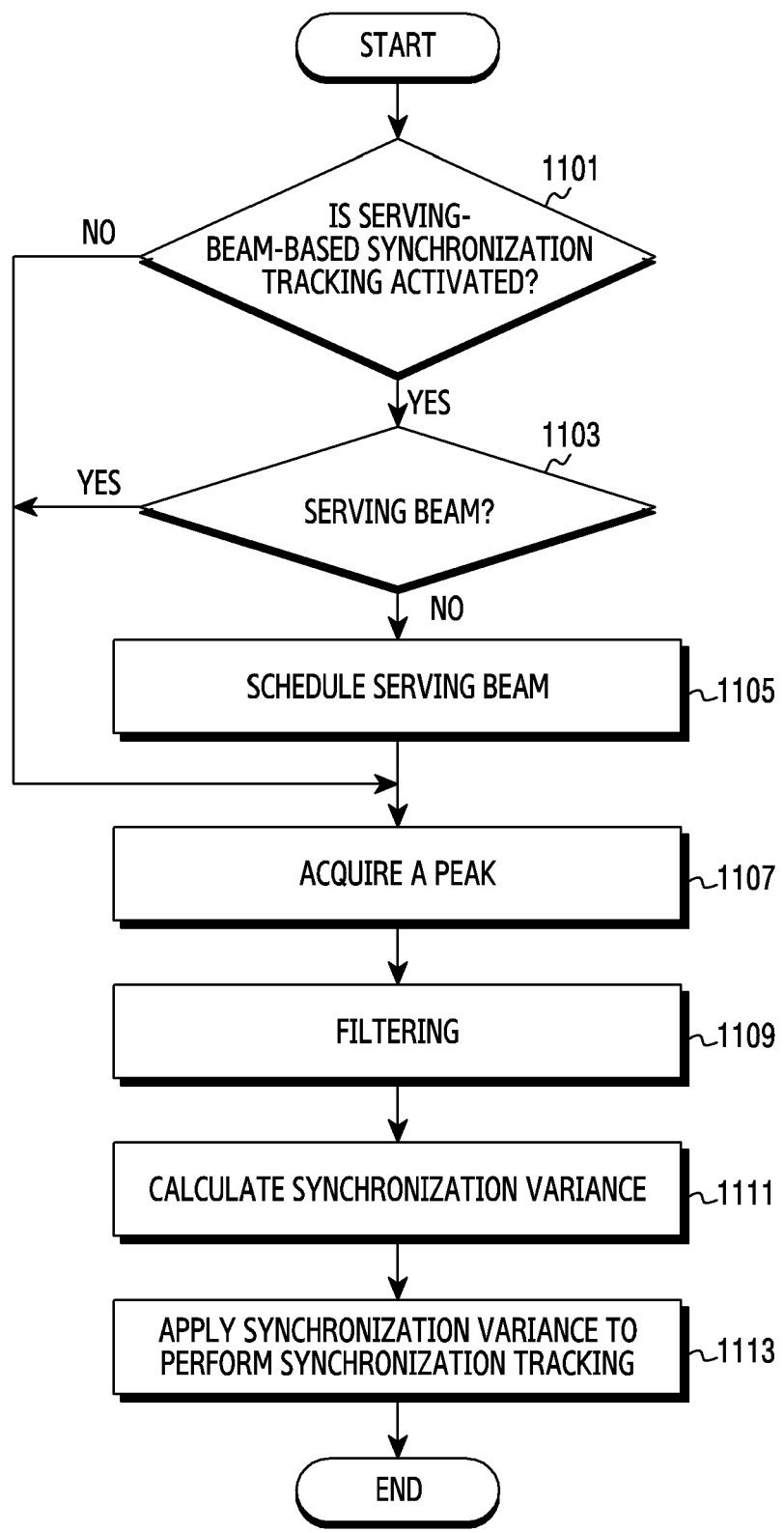
FIG. 11 is a flowchart illustrating an operation of a terminal for beam-based synchronization tracking according to various embodiments of the disclosure.

FIG. 11 is a flowchart illustrating an operation of a terminal for beam-based synchronization tracking according to various embodiments of the disclosure. FIG. 11 illustrates an example of an operating method of the terminal 120. A beam-based synchronization tracking procedure of FIG. 11 may correspond to operation 703 of FIG. 7, operation 805 of FIG. 8, and operation 1005 of FIG. 10.

Referring to FIG. 11, in operation 1101, the terminal may determine whether a serving-beam-based synchronization tracking function is activated. When the serving-beam-based synchronization tracking function is activated, the terminal may perform synchronization tracking by using a serving beam. When the serving-beam-based synchronization tracking function is not activated, the terminal may perform synchronization tracking by using any beam regardless of whether any beam is a serving beam. Any beam may be a serving beam or a neighboring beam. That is, the terminal may perform synchronization tracking according to an any-beam-based synchronization tracking scheme. When the serving-beam-based synchronization tracking function is activated, the terminal may perform operation 1103. When the serving-beam-based synchronization tracking function is not activated, the terminal may perform operation 1107.

In operation 1103, the terminal may determine whether a scheduled beam is a serving beam. When the scheduled beam is a serving beam, the terminal may not perform separate beam scheduling. Accordingly, the terminal may perform operation 1107. When the scheduled beam is not a serving beam, the terminal may perform operation 1105 so that the terminal can use a serving beam. In operation 1105, the terminal may schedule a serving beam.

In operation 1107, the terminal may acquire a peak. The terminal may acquire a peak of a currently-scheduled beam. The terminal may receive a signal by using the scheduled beam. The terminal may perform correlation calculation on the signal. Specifically, the terminal may perform correlation calculation between a candidate sequence of a signal and a sequence (e.g., a synchronization sequence) of the actually-received signal. In order to determine a reception time point of an actual signal in a designated range, the terminal may repeatedly perform correlation calculation. According to a result of the correlation calculation, the terminal may determine correlation values depending on the level at which the two sequences coincide with each other. The terminal may acquire a correlation value of the peak. For example, among the correlation values, the terminal may acquire a peak correlation value larger than or equal to a correlation threshold or the largest peak correlation value. A time point of detection of a peak correlation value is a time point of reception of a sequence of an expected signal. The terminal may determine a time point of acquisition of a peak, that is, a time point of detection of a peak correlation value. A position of detection of a peak correlation value may be referred to as a "SS peak position."

When the scheduled beam is a serving beam, the terminal may acquire a peak of the serving beam. The terminal may acquire a peak of the serving beam, from updated synchronization information or synchronization information of a serving beam acquired after initial synchronization. When the scheduled beam is not a serving beam, the terminal may acquire a peak of a neighboring beam. During any-beam-based synchronization tracking, the terminal may store synchronization information of a neighboring beam as well as a serving beam, and may calculate a synchronization variance. The terminal may acquire a peak of a neighboring beam by using pieces of pre-stored synchronization information of neighboring beams.

In operation 1109, the terminal may perform filtering. In this example, the term "filtering" refers to filtering of interference to a neighboring cell. During any-beam-based synchronization tracking, the terminal may schedule not only a beam corresponding to a serving beam but also a beam corresponding to a neighboring beam. Accordingly, when a scheduled neighboring beam is oriented to a neighboring cell, the terminal may detect a peak of a synchronization signal transmitted from the neighboring cell.

Figure 12:
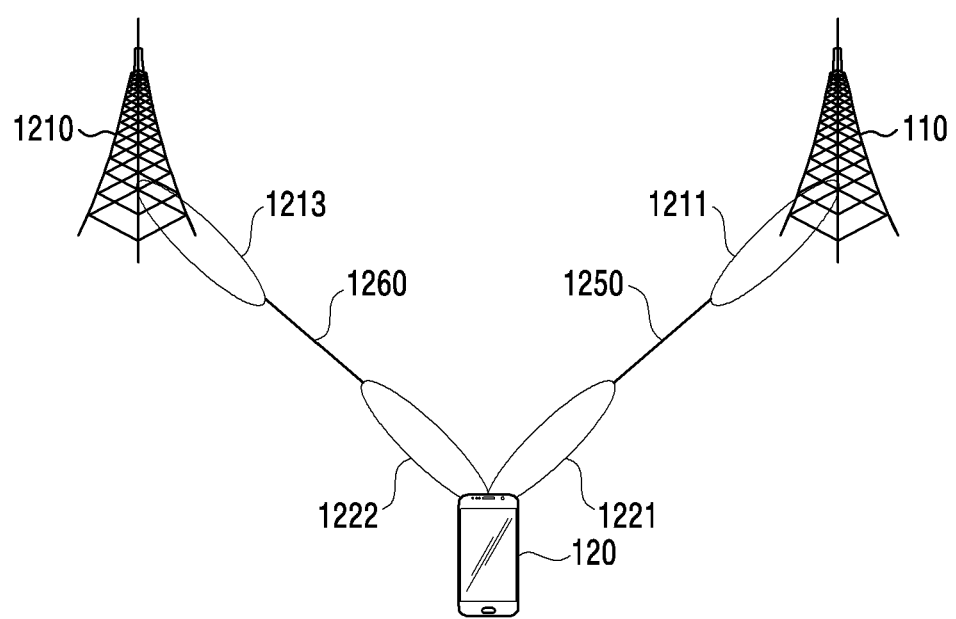
FIG. 12 illustrates an example of interference during any-beam-based synchronization tracking according to various embodiments of the disclosure.

FIG. 12 illustrates an example of interference during any-beam-based synchronization tracking according to various embodiments of the disclosure.

Referring to the example illustrated in FIG. 12, the terminal 120 may perform any-beam-based synchronization tracking and beam tracking.

FIG. 12 illustrates a situation in which a serving beam for the terminal 120 is a beam 1221 and a serving beam for the base station 110 is a beam 1211. That is, a current optimal beam-pair link is a link 1250 according to various embodiments of the disclosure. In order to perform any-beam-based synchronization tracking, the terminal 120 may schedule not only the serving beam 1221 but also a neighboring beam 1222.

When the terminal 120 receives a signal from the base station 110 through the neighboring beam 1222, a neighboring base station 1210 may transmit a synchronization signal by using a beam 1213. In this example, a link 1260 which may be formed by the beam 1213 and the beam 1222 may provide channel quality higher than that of a link (not illustrated) which may be formed with the base station 110 through the beam 1222. Accordingly, the terminal may also acquire a peak of the neighboring base station 1210. In particular, when a neighboring beam is scheduled during any-beam-based synchronization tracking, the terminal may more strongly receive a signal from a neighboring cell than in a case where a serving beam is scheduled during serving-beam-based synchronization tracking. Accordingly, in order to acquire a peak of a cell currently being accessed, the terminal may perform filtering.

According to various embodiments, the terminal may apply defined filtering rules so as to perform filtering. Embodiments of the defined filtering rules will be described below in detail with reference to FIGS. 13A and 13B.

In operation 1111, the terminal may calculate a synchronization variance. The terminal may determine a difference between a first cell time of a scheduled beam in a previous cycle (e.g., a beamforming interval) and a second cell time of a scheduled beam in a current cycle. The terminal may calculate a synchronization variance according to the difference between the first cell time and the second cell time. In this example, it should be noted that a cell time does not need to be a cell time of a serving beam. A cell time may be a cell time of a neighboring beam. Also, a synchronization variance may be a synchronization variance of a serving beam or a synchronization variance of a neighboring beam.

In operation 1113, the terminal may apply the synchronization variance so as to perform synchronization tracking. A synchronization variance is irrelevant to whether a main cause of a synchronization change is a serving beam or a neighboring beam, and thus may have identical or similar change trends. Accordingly, the terminal may perform synchronization tracking according to a synchronization variance of a neighboring beam as well as a synchronization variance of a serving beam.

The terminal may update synchronization information by the synchronization variance. For example, the terminal may compensate for an offset of a cell time (hereinafter "cell time offset") by the synchronization variance. When a synchronization variance is 3, a value of a cell time offset may be increased by three. The terminal may compensate for a cell time offset so as to update a synchronization range for determination of synchronization success.

According to various embodiments, the terminal may apply not only a synchronization variance of a scheduled beam but also synchronization variances of other beams so as to perform synchronization tracking. The terminal may apply multiple synchronization variances so as to update synchronization information. For example, the terminal may take an average on synchronization variances so as to update synchronization information. As another example, the terminal may apply a weight to each of synchronization variances so as to update synchronization information. Additionally, the terminal may identify at least some of synchronization variances, and may take an average on the at least some synchronization variances or may apply a weight to each of the at least some synchronization variances so as to update synchronization information. As an example, at least some of synchronization variances may be identified according to channel quality of each beam. As another example, at least some of synchronization variances may be identified according to a tendency of each of the synchronization variances. This is because reliability is determined to be low when only one of values of the synchronization variances is a negative number and values of the remaining synchronization variances are positive numbers.

FIG. 11 illustrates the specific operations for synchronization tracking according to the disclosure. In FIG. 11, the filtering operation in operation 1109 is illustrated as being always performed, but the disclosure is not limited thereto. For example, when a serving beam is scheduled, the terminal may not perform the filtering operation. During synchronization tracking using a serving beam, an effect on the serving beam incurred by interference may be smaller than those on neighboring beams.

Figure 13A:
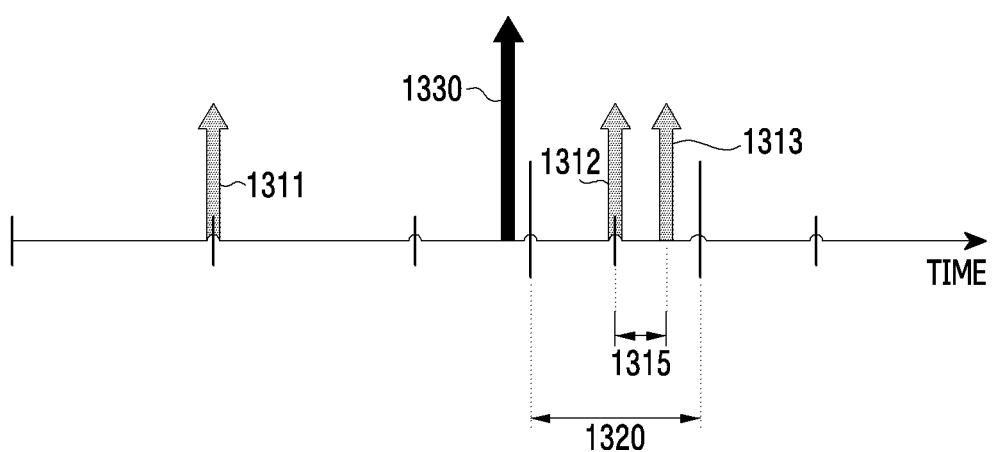
FIG. 13A illustrates an example of filtering out interference during any-beam-based synchronization tracking according to various embodiments of the disclosure.

FIG. 13A illustrates an example of filtering out interference during any-beam-based synchronization tracking according to various embodiments of the disclosure. For convenience of description, a beam currently scheduled for synchronization tracking by a terminal is referred to as a "pending beam."

Referring to FIG. 13A, the terminal may receive a synchronization signal. The terminal may receive a synchronization signal by using a pending beam. The terminal may acquire a first peak 1311 of the pending beam during a first synchronization interval. In this example, a synchronization interval is an interval during which a pending beam is scheduled for synchronization tracking, and is referred to as a "periodically-repeated interval during which synchronization of a pending beam is tracked." The terminal may determine, as a first cell time, a time point at which the first peak 1311 is detected during a first synchronization interval.

The terminal may update an offset so that a time point corresponding to the first peak 1311 can be a cell time. The terminal may update an offset so as to determine a second cell time corresponding to the first cell time during a second synchronization interval which is a next synchronization interval. The terminal may determine a synchronization range (not illustrated) based on the second cell time. The term "synchronization range" refers to a range for determination of whether synchronization is successful. In the synchronization range, the terminal may perform correlation calculation so as to detect a peak. In the synchronization range, the terminal may detect a synchronization signal in the second synchronization interval. A second peak 1312 is expected to be detected in the synchronization range. Accordingly, the terminal may perform correlation calculation in the synchronization range.

The terminal may receive a synchronization signal in the synchronization range. The terminal receives a synchronization signal by using the pending beam. The terminal may acquire a third peak 1313 of the pending beam during the second synchronization interval. The terminal may detect the third peak 1313 instead of the second peak 1312. The terminal detects the third peak 1313 at a position which is away from the second cell time by a synchronization variance 1315. The terminal may detect the third peak 1313 so as to determine the synchronization variance 1315. For a next synchronization interval, the terminal may apply the synchronization variance 1315 so as to update synchronization information. In the synchronization range, the terminal may detect not only the third peak 1313 but also a neighboring peak 1330 of a neighboring cell.

According to various embodiments, the terminal may perform filtering according to configuration of a tracking range 1320. The terminal may configure a tracking range with reference to an expected point of reception of a signal (hereinafter "expected cell time"), that is, a second cell time. The terminal may cause the tracking range 1320 to be narrower than the synchronization range so as to filter out a peak detected at a point which is beyond the second cell time. As an example, the terminal may filter out the neighboring peak 1330 of the neighboring cell. The terminal may acquire the third peak 1313 of the pending beam.

Figure 13B:
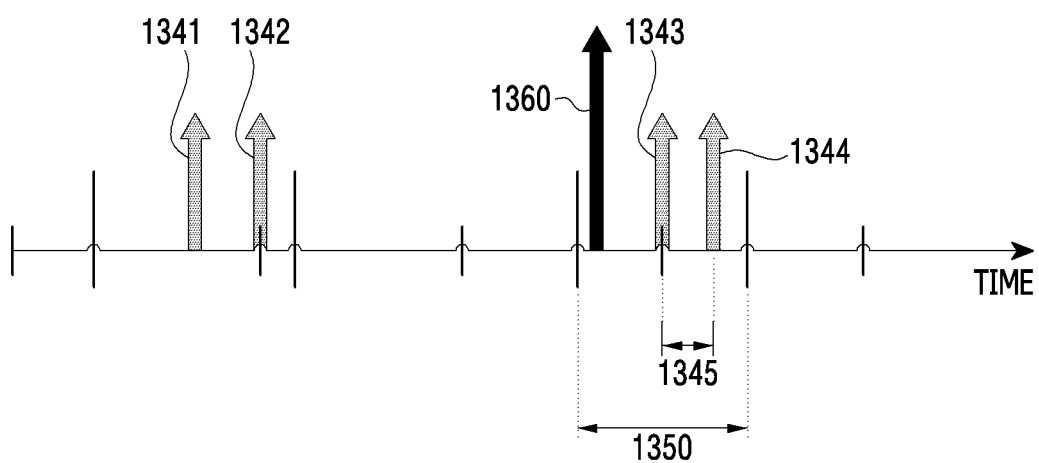
FIG. 13B illustrates another example of filtering out interference during any-beam-based synchronization tracking according to various embodiments of the disclosure.

FIG. 13B illustrates another example of filtering out interference during any-beam-based synchronization tracking according to various embodiments of the disclosure. A detailed description of a configuration, which overlaps FIG. 13A, will be omitted.

Referring to FIG. 13B, a terminal may receive a synchronization signal. The terminal receives a synchronization signal by using a pending beam. The terminal configures a synchronization range for detection of a first peak 1341 of the pending beam during a first synchronization interval. This is because, during a previous synchronization interval, the first peak 1341 is expected to be detected at a first cell time. The terminal determines the first cell time as an expected cell time in the first synchronization interval. The terminal detects a second peak 1342 in the synchronization range. The terminal determines a time point of detection of the second peak 1342 as a second cell time.

The terminal updates an offset so that a time point corresponding to the second peak 1342 can be a cell time. The terminal may update the offset so as to determine a third cell time corresponding to the second cell time during a second synchronization interval which is a next synchronization interval. The terminal may determine the third cell time as an expected cell time in the second synchronization interval. The terminal may determine a synchronization range 1350 based on the third cell time. The terminal may detect a synchronization signal in the second synchronization interval in the synchronization range 1350. A third peak 1343 is expected to be detected in the synchronization range 1350. Accordingly, the terminal may perform correlation calculation in the synchronization range 1350.

The terminal may receive a synchronization signal in the synchronization range. The terminal receives a synchronization signal by using the pending beam. The terminal may acquire a fourth peak 1344 of the pending beam during the second synchronization interval. The terminal may detect the fourth peak 1344 instead of the third peak 1343. The terminal may detect the fourth peak 1344 so as to determine a synchronization variance 1345. For a next synchronization interval, the terminal may apply the synchronization variance 1345 so as to update synchronization information. In the synchronization range, the terminal may detect not only the fourth peak 1344 but also a neighboring peak 1360 of a neighboring cell.

According to various embodiments, the terminal may perform filtering according to a gradient of a synchronization variance. If filtering is performed using only the configuration a tracking range of FIG. 13A, when a peak of a neighboring cell is closer to an expected cell time than a peak of a serving cell, it is difficult to smoothly filter out the peak of the neighboring cell. Accordingly, the terminal may determine a gradient of a synchronization variance.

A gradient may be a metric representing a tendency of a synchronization variance. A synchronization variance is a synchronization error caused by temperature, pressure, and a change with the passage of time, and may be understood as a phenomenon in which a deviation with the original reference time point becomes larger as time passes. A cell time offset may become larger or smaller as a synchronization interval is repeated. A cell time offset may be changed while maintaining a slope which is either of a positive number and a negative number. For example, when the terminal has acquired values of synchronization variances which are positive numbers during previous synchronization intervals but a synchronization variance at a point, at which a peak occurs, is a negative number during a current synchronization interval, the relevant peak may be determined as a peak of a neighboring cell. The terminal may filter out the peak of the neighboring cell. As an example, the terminal may filter out the neighboring peak 1360 of the neighboring cell. The terminal may check that the synchronization variance 1345 is a positive number, and then may acquire a fourth peak 1344 of the pending beam. It goes without saying that filtering according to the disclosure can also be similarly applied to a case in which values of synchronization variances which are negative numbers have been acquired during previous synchronization intervals and a neighboring peak has a synchronization variance which is a positive number.

Figure 13C:
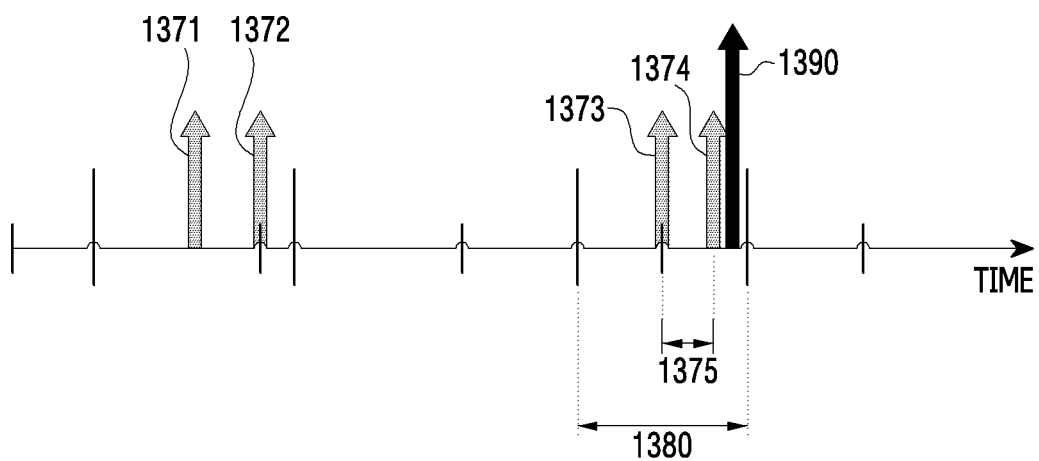
FIG. 13C illustrates still another example of filtering out interference during any-beam-based synchronization tracking according to various embodiments of the disclosure.

FIG. 13C illustrates still another example of filtering out interference during any-beam-based synchronization tracking according to various embodiments of the disclosure. A detailed description of configurations, which overlap FIGS. 13A and 13B, will be omitted.

Referring to FIG. 13C, a terminal may receive a synchronization signal. The terminal receives a synchronization signal by using a pending beam. The terminal configures a synchronization range for detection of a first peak 1371 of the pending beam during a first synchronization interval. The terminal detects a second peak 1372 in the synchronization range. The terminal updates an offset so that a time point corresponding to the second peak 1372 can be a cell time. The terminal may update the offset so as to determine an expected cell time in a second synchronization interval which is a next synchronization interval. The terminal may determine a synchronization range 1380 based on the expected cell time. A third peak 1373 is expected to be detected in the synchronization range 1380. The terminal may acquire a fourth peak 1374 of the pending beam during a second synchronization interval. The terminal may detect the fourth peak 1374 instead of the third peak 1373. The terminal may detect the fourth peak 1374 so as to determine a synchronization variance 1375. In the synchronization range 1380, the terminal may detect not only the fourth peak 1374 but also a neighboring peak 1390 of a neighboring cell.

According to various embodiments, the terminal may perform filtering based on a cell identifier (ID). If only the filtering based on a gradient of FIG. 13B is performed, when a peak of a neighboring cell is detected in the same direction as a direction, in which a peak of a serving cell is detected, with reference to an expected cell time, it is difficult to smoothly filter out a peak of a neighboring cell. Accordingly, the terminal may compare a cell ID with another so as to perform filtering. The terminal may determine whether a cell ID of a synchronization signal, the peak of which has been detected, coincides with a cell ID of a serving cell. The terminal may use a sequence of the synchronization signal, the peak of which has been detected, to determine whether the cell ID of the synchronization signal corresponds to the cell ID of the serving cell. A synchronization sequence may be predefined according to the type of synchronization signal. The type of synchronization signal may be a PSS, an SSS, or an ESS.

A PSS indicates a cell ID (e.g., 0, 1, 2) within a cell group, and an SSS indicates an ID (e.g., 0, 1, . . . , 167, or 0, 1, . . . , 335) of a cell group. According to an embodiment, the terminal may determine whether a synchronization signal, the peak of which has been detected, has been transmitted from a serving cell, based on whether cell IDs within a cell group are identical to each other. Also, according to an embodiment, the terminal may determine whether a synchronization signal, the peak of which has been detected, has been transmitted from a serving cell, based on whether cell group IDs are identical to each other. Further, according to an embodiment, the terminal may detect both a synchronization sequence of a PSS and a synchronization sequence of an SSS so as to identify a cell ID. The terminal may determine whether a synchronization signal, the peak of which has been detected, has been transmitted from a serving cell, based on whether cell IDs are identical to each other.

An ESS may be scrambled according to a cell ID. According to an embodiment, the terminal may determine whether a synchronization signal, the peak of which has been detected, has been transmitted from a serving cell, based on a cell ID of the serving cell. As an example, the terminal may check a scrambling ID of a sequence of the neighboring peak 1390 of the neighboring cell so as to filter out the neighboring peak 1390. The terminal: may determine whether a cell ID of a cell, from which a synchronization sequence of the neighboring peak 1390 has been transmitted, coincides with a cell ID of a serving cell; may determine whether a cell ID of a cell, from which a synchronization sequence of the fourth peak 1374 has been transmitted, coincides with the cell ID of the serving cell; and then may filter out the neighboring peak 1390.

On-Demand Interworking

Figure 14:
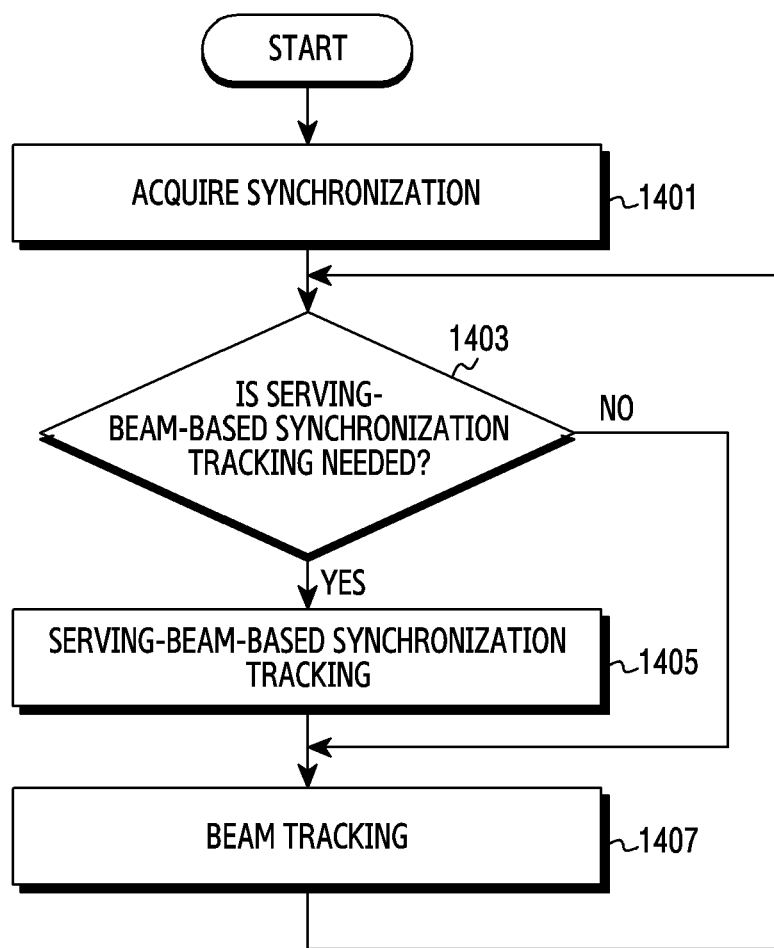
FIG. 14 is a flowchart illustrating an operation of a terminal for on-demand interworking between serving-beam-based synchronization tracking and beam tracking according to various embodiments of the disclosure.

FIG. 14 is a flowchart illustrating an operation of a terminal for on-demand interworking between serving-beam-based synchronization tracking and beam tracking according to various embodiments of the disclosure. FIG. 14 illustrates an example of an operating method of the terminal 120. On-demand interworking signifies operations of a terminal for performing interworking between synchronization tracking and beam tracking only when the need arises and performing beam tracking in other cases.

Referring to FIG. 14, in operation 1401, the terminal may acquire synchronization. The terminal may acquire synchronization of a serving beam. Operation 1401 corresponds to operation 601 of FIG. 6, and thus a detailed description of the overlapping configuration will be omitted.

In operation 1403, the terminal may determine whether serving-beam-based synchronization tracking is needed. Embodiments for determining whether serving-beam-based synchronization tracking is needed will be described below in detail with reference to FIGS. 15A and 15B. When serving-beam-based synchronization tracking is determined to be needed, the terminal may perform operation 1405. When serving-beam-based synchronization tracking is determined not to be needed, the terminal may perform operation 1407.

In operation 1405, the terminal may perform serving-beam-based synchronization tracking. The terminal may schedule the serving beam. The terminal may receive a signal by using the serving beam so as to perform synchronization tracking using the serving beam. Operation 1405 corresponds to operation 703 of FIG. 7, and thus a detailed description of the overlapping configuration will be omitted.

In operation 1407, the terminal may perform beam tracking. The terminal may perform beam tracking of a neighboring beam. The terminal may receive a signal by using a neighboring beam so as to measure quality of the received signal. The terminal may determine channel quality of the neighboring beam.

When operation 1405 is not performed, in a relevant cycle, the terminal may not perform synchronization tracking or may perform any-beam-based synchronization tracking. For example, when beam tracking of a neighboring beam is performed, the terminal may additionally perform synchronization tracking by using the neighboring beam.

The terminal may perform operation 1407, and then may repeatedly perform operation 1403. According to various embodiments, the terminal may determine when to terminate a beam tracking procedure and again perform operation 1403, according to an interworking scheme of the terminal. For example, the terminal may determine channel qualities of all the neighboring beams for beam tracking, and may again perform operation 1403. Channel qualities of all the neighboring beams are determined, and thus the serving beam may be updated. As another example, the terminal may again perform operation 1403 whenever a scheduled beam is changed. The terminal may again perform operation 1403 in each measurement unit interval. As still another example, the terminal may perform beam tracking of neighboring beams, the number of which corresponds to a fixed number, and then may again perform operation 1403. As yet another example, the terminal may again perform operation 1403 for each fixed time.

Figure 15A:
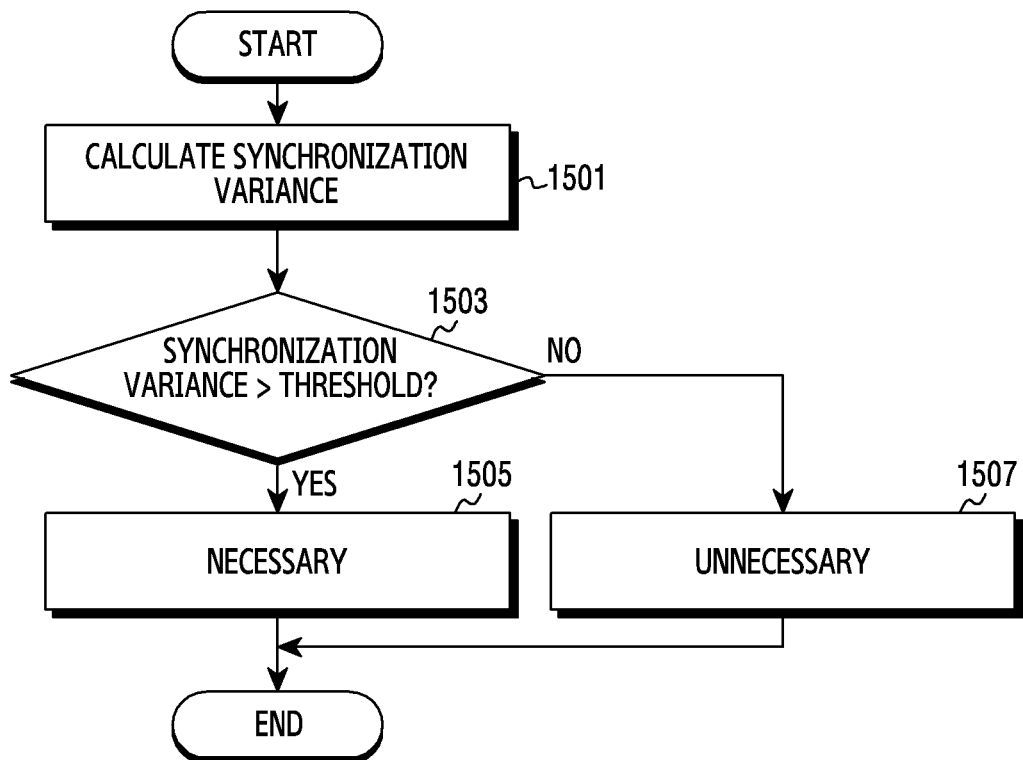
FIG. 15A is a flowchart illustrating an operation of a terminal for determining whether to perform serving-beam-based synchronization tracking according to various embodiments of the disclosure.

FIG. 15A is a flowchart illustrating an operation of a terminal for determining whether to perform serving-beam-based synchronization tracking according to various embodiments of the disclosure. FIG. 15A illustrates an example of an operating method of the terminal 120.

Referring to FIG. 15A, in operation 1501, the terminal may calculate a synchronization variance. A synchronization variance may be a synchronization variance of any beam. Accordingly, a synchronization variance may be a synchronization variance of a serving beam or a synchronization variance of a neighboring beam. The terminal may determine a synchronization variance based on a difference between synchronization information of a pending beam acquired during a previous synchronization interval and synchronization information of the pending beam acquired during a current synchronization interval. Specifically, the terminal may determine a difference between a cell time in a previous synchronization interval and a cell time in a current synchronization interval.

In operation 1503, the terminal may determine whether a synchronization variance is larger than a threshold. The terminal may set a threshold to a fixed constant. A threshold may be determined based on tracking performance of the terminal and peak detection capability of the terminal. The terminal may configure a threshold as a variable. According to an embodiment, a threshold may be determined based on the length of a CP. The length of a CP is related to a range in which a synchronization error can be allowed. The terminal may configure a threshold so that the threshold becomes larger as the length of a CP becomes longer. The length of a CP may be determined based on whether the CP is a normal CP (NCP) or an extended CP (ECP), or the configuration of a subcarrier spacing (SCS). When a synchronization variance is larger than the threshold, the terminal may perform operation 1505. When a synchronization variance is not larger than the threshold, the terminal may perform operation 1507.

In operation 1505, the terminal may determine that serving-beam-based synchronization tracking is needed. This is because the possibility of out-of-synchronization is high when the synchronization variance is exceedingly large (e.g., is larger than or equal to the threshold). In operation 1507, the terminal may determine that serving-beam-based synchronization tracking is not needed. This is because the possibility of successful synchronization is high through a compensation procedure using the synchronization variance in a synchronization range when the degree of the synchronization variance is slight.

Figure 15B:
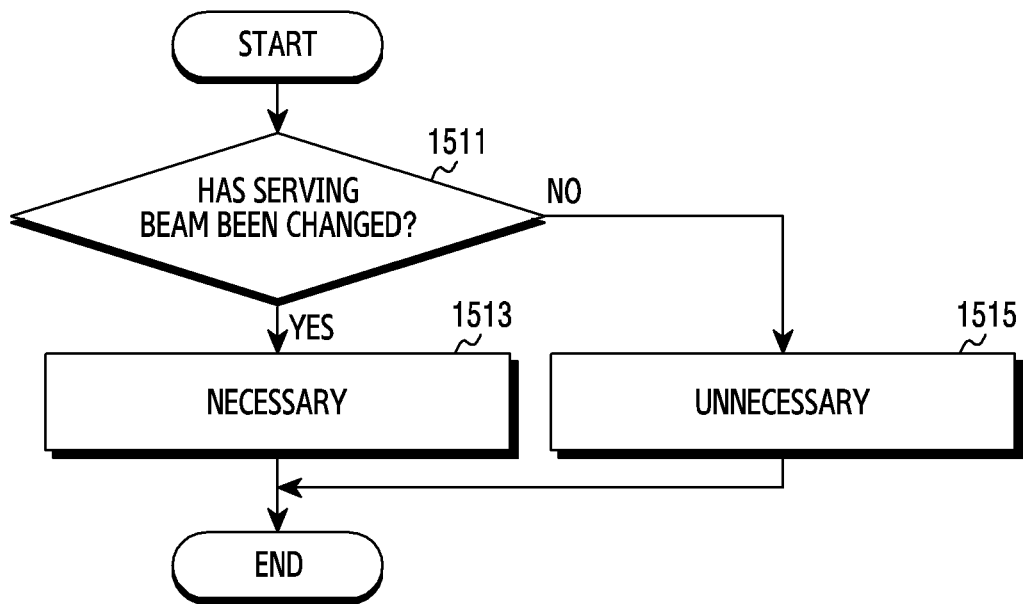
FIG. 15B is a flowchart illustrating another operation of a terminal for determining whether to perform serving-beam-based synchronization tracking according to various embodiments of the disclosure.

FIG. 15B is a flowchart illustrating another operation of a terminal for determining whether to perform serving-beam-based synchronization tracking according to various embodiments of the disclosure. FIG. 15B illustrates an example of an operating method of the terminal 120.

Referring to FIG. 15B, in operation 1511, the terminal may determine whether a serving beam has been changed. When channel quality of a neighboring beam is higher than that of a serving beam during beam tracking, the terminal may change the serving beam. In contrast, although channel qualities of all the neighboring beams are determined, when channel quality of a serving beam is higher than those of all the neighboring beams, the terminal may maintain the current serving beam without changing the serving beam.

A serving beam signifies a beam having the highest channel quality among beams of the terminal, and thus a change of the serving beam may signify a change in a wireless channel between a base station and the terminal. Such a change in a wireless channel may be caused by the movement of the terminal, the entrance of an obstacle into a channel, the passage of time, or the like. According to a change in a wireless channel, a physical path for transmission of a signal is changed or a propagation speed is changed, and thus synchronization may also be changed. Accordingly, the terminal may determine whether to perform serving-beam-based synchronization tracking, based on whether to change a serving beam. When the serving beam has been changed, the terminal may perform operation 1513. When the serving beam has not been changed, the terminal may perform operation 1515.

In operation 1513, the terminal may determine that serving-beam-based synchronization tracking is needed. When the serving beam has been changed, the terminal may perform synchronization tracking using a changed serving beam. This is because the terminal needs to accurately acquire initial synchronization of the changed serving beam. Synchronization acquired at a previous location of the terminal or in a previous state of a wireless channel is no longer effective at a current location of the terminal or in a current state of a wireless channel. In operation 1515, the terminal may determine that serving-beam-based synchronization tracking is not needed. This is because the degree of movement of the terminal or the degree of a state change of a wireless channel is relatively low.

Figure 15C:
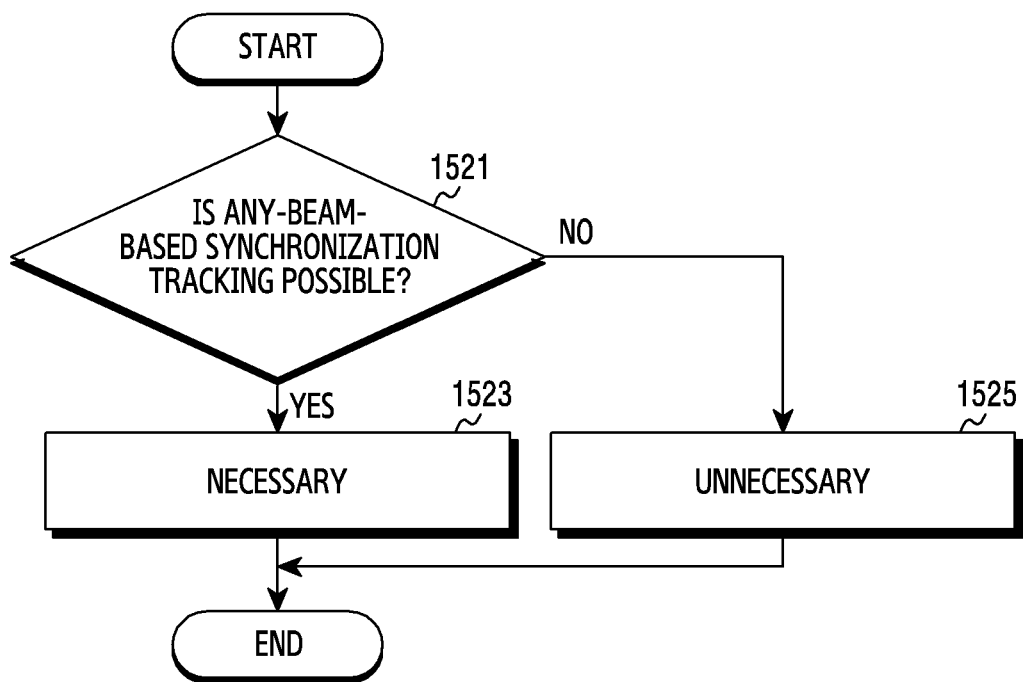
FIG. 15C is a flowchart illustrating still another operation of a terminal for determining whether to perform serving-beam-based synchronization tracking according to various embodiments of the disclosure.

FIG. 15C is a flowchart illustrating still another operation of a terminal for determining whether to perform serving-beam-based synchronization tracking according to various embodiments of the disclosure. FIG. 15C illustrates an example of an operating method of the terminal 120.

Referring to FIG. 15C, in operation 1521, the terminal may determine whether it is possible to perform any-beam-based synchronization tracking. The terminal may determine whether it is possible to perform synchronization tracking by using other neighboring beams as well as a serving beam. The terminal may determine whether it is possible to perform synchronization tracking by using neighboring beams, based on channel quality of each of the neighboring beams. For example, when channel quality of each of the neighboring beams is lower than or equal to a reference value, the terminal may determine that the neighboring beams are inappropriate for performing synchronization tracking. As an example, when the terminal is located on an open path between the terminal and a base station, it may be difficult for the terminal to receive a signal through a reflected wave by using neighboring beams. In particular, when the terminal is located at a cell boundary of the base station, it may be difficult for the terminal to receive a synchronization signal by using neighboring beams and detect a peak. When it is possible to perform any-beam-based synchronization tracking, the terminal may perform operation 1523. When it is impossible to perform any-beam-based synchronization tracking, the terminal may perform operation 1525.

In operation 1523, the terminal may determine that serving-beam-based synchronization tracking is needed. For beam tracking, the terminal needs to perform measurement. In order to accurately measure signals transmitted by the base station, the terminal is required to perform synchronization tracking. However, channel qualities of beams other than a serving beam are inappropriate for synchronization tracking, and thus the terminal may determine that serving-beam-based synchronization tracking is needed. In operation 1525, the terminal may determine that serving-beam-based synchronization tracking is not needed. This is because it is possible to perform synchronization tracking by using neighboring beams.

The conditions for determination of whether serving-beam-based synchronization tracking is needed have been described with reference to FIGS. 15A, 15B, and 15C. According to various embodiments, a terminal may combine at least two of the above-described conditions so as to determine whether serving-beam-based synchronization tracking is needed.

The embodiments for performing serving-beam-based synchronization tracking according to the on-demand interworking scheme have been described with reference to FIGS. 14, 15A, 15B, and 15C. However, the disclosure is not limited thereto. According to various embodiments, a terminal may perform synchronization tracking including serving-beam-based synchronization tracking and any-beam-based synchronization tracking, according to an on-demand interworking scheme.

Figure 16:
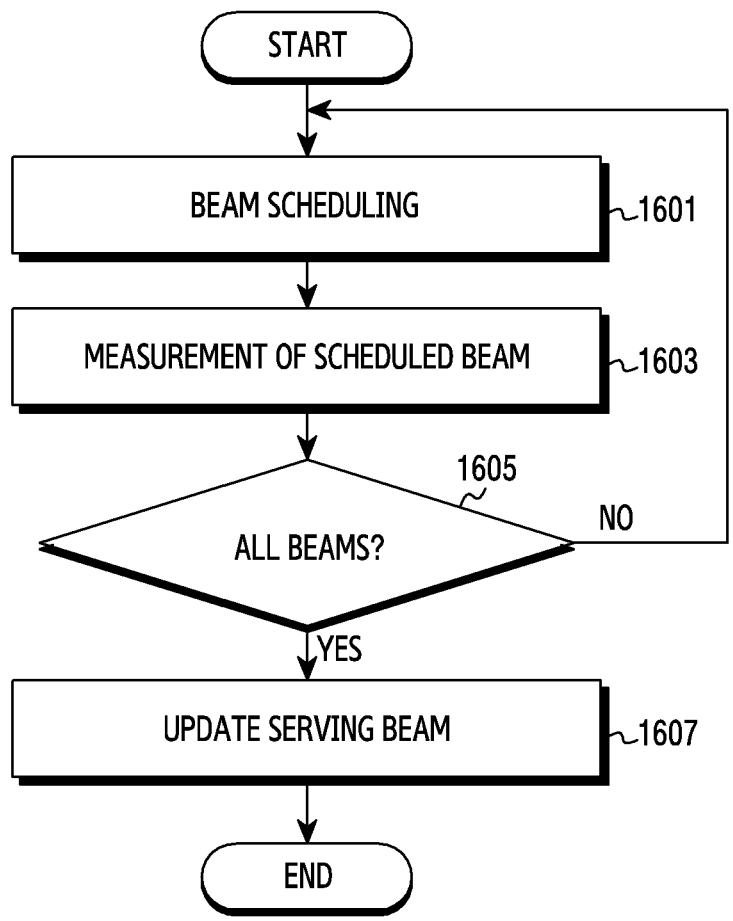
FIG. 16 is a flowchart illustrating an operation of a terminal for updating a serving beam according to various embodiments of the disclosure.

FIG. 16 is a flowchart illustrating an operation of a terminal for updating a serving beam according to various embodiments of the disclosure. FIG. 16 illustrates an example of an operating method of the terminal 120.

Referring to FIG. 16, in operation 1601, the terminal may perform beam scheduling. The terminal may perform beam sweeping. The terminal may sequentially change a beam according to a defined pattern so as to sweep a beam. The terminal may schedule each of all beams for beam tracking in each cycle.

In operation 1603, the terminal may perform measurement of a scheduled beam. The terminal may receive a signal by using the scheduled beam so as to determine channel quality of the received signal. According to various embodiments, the terminal may perform synchronization tracking while performing measurement. When a signal is received, the terminal may acquire synchronization information. The terminal may update synchronization information by using previous synchronization information of the scheduled beam.

In operation 1605, the terminal may determine whether beam tracking of all the beams has been performed. In this example, all the beams may signify beams of the terminal configured for beam tracking. For example, the beams of the terminal configured for beam tracking may be all beams which can be supported by the terminal. As another example, the beams of the terminal configured for beam tracking may signify all beams which can be supported by a particular constituent element (e.g., an RF-antenna) among multiple constituent elements within the terminal.

In operation 1607, the terminal may update the serving beam. Operation 1607 corresponds to operation 709 of FIG. 7, and thus a detailed description of the overlapping configuration will be omitted.

Figure 17:
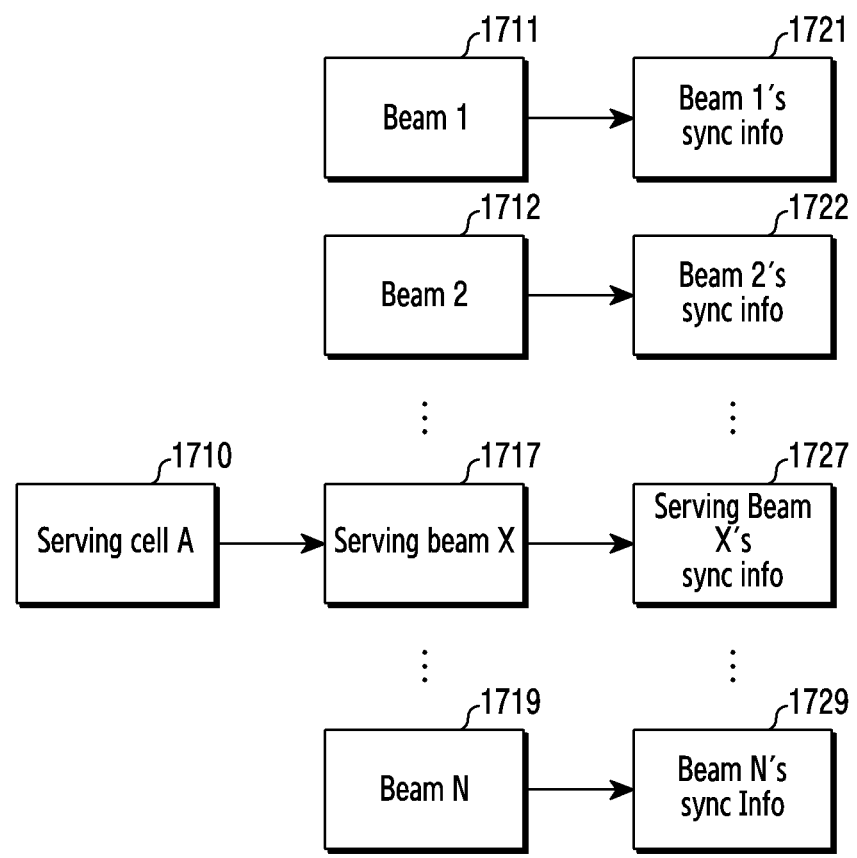
FIG. 17 is a block diagram illustrating an example of managing synchronization information according to various embodiments of the disclosure.

FIG. 17 is a block diagram illustrating an example of managing synchronization information according to various embodiments of the disclosure. In this example, synchronization information may include parameters (e.g., a cell time, an offset, and a synchronization range) related to synchronization of a signal received (or transmitted) using a beam. In order to estimate or monitor a synchronization variance by using any beam, it is necessary to store and manage synchronization information for each beam. Hereinafter, an example of a database configured to store and manage beam-specific synchronization information will be described.

Referring to FIG. 17, in order to estimate a synchronization variance of any beam, a terminal may manage synchronization information of each of all beams for beam tracking. Hereinafter, a situation in which the terminal performs synchronization and beam tracking in a serving cell 1710 of a base station will be described by way of example.

When initial synchronization is acquired in an initial access procedure, the terminal may store synchronization information 1727 of an X-th beam 1717 which is a serving beam. Thereafter, when a serving beam is scheduled and serving-beam-based synchronization tracking is performed, the terminal may update the synchronization information 1727. Also, even when any-beam-based synchronization tracking is performed, the terminal may update the synchronization information 1727.

During any-beam-based synchronization tracking, the terminal may use synchronization information of a neighboring beam. During beam tracking, the terminal may schedule a neighboring beam. Whenever a neighboring beam is scheduled, the terminal may store synchronization information of the neighboring beam. For example, the terminal may sequentially schedule a first beam 1711, a second beam 1712, . . . , and an N-th beam 1719, and may store synchronization information 1721, 1722, . . . , 1727, . . . , 1729, of a relevant beam. According to the scheduling order, the terminal may sequentially store and update the first beam 1711, the second beam 1712, . . . , and the N-th beam 1719. During beam tracking according to beam sweeping, when the X-th beam 1717 which is a serving beam is scheduled, the terminal may update the previously-acquired synchronization information 1727.

The method for scheduling, by a terminal, a beam through interworking between synchronization tracking and beam tracking has been described above. When the need arises, the terminal performs synchronization tracking or controls the number of times of scheduling of neighboring beams, and thus can improve the performance of synchronization tracking. Also, the terminal schedules neighboring beams by the appropriate frequency, and thus can optimize the performance of an adaptive link in a beamforming environment. Whether the interworking between synchronization tracking and beam tracking according to the disclosure is implemented can be identified according to whether a serving beam is periodically scheduled. Further, whether the interworking therebetween according to the disclosure is implemented can be identified according to whether the terminal detects peaks of synchronization sequences from a neighboring beam as well as a serving beam or whether the terminal stores synchronization information (beam-specific synchronization information).

According to various embodiments, after scheduling of neighboring beams, synchronization information of a serving beam can be updated. Without scheduling of the serving beam, a next interval (e.g., at least one symbol) after scheduling of a neighboring beam, or immediately after scheduling of a neighboring beam, the terminal can update synchronization information (e.g., an offset, an expected cell time, and a synchronization range) of the serving beam. In other words, whether the disclosure is implemented can be confirmed through identification of non-scheduling of the serving beam between an interval during which synchronization information of the serving beam is updated, and an interval during which a neighboring beam is scheduled.

In the disclosure, in order to determine whether a particular condition is fulfilled, the expression "greater than or equal to (or greater than)," or the expression "less than or equal to (or less than)" is used, but this expression is only a description for expressing an example, and thus does not exclude the description "greater than (or greater than or equal to)," or the description "less than (or less than or equal to)." For example, a condition described by the expression "greater than or equal to" can be replaced by a condition described by the expression "greater than." A condition described by the expression "less than or equal to" can be replaced by a condition described by the expression "less than." A condition described by the expression "greater than" can be replaced by a condition described by the expression "greater than or equal to." A condition described by the expression "less than" can be replaced by a condition described by the expression "less than or equal to." A condition described by the expressions "greater than or equal to" and "less than" can be replaced by a condition described by the expressions "greater than" and "less than or equal to." A condition described by the expressions "greater than" and "less than or equal to" can be replaced by a condition described by the expressions "greater than or equal to" and "less than."

Methods according to claims of the disclosure or embodiments described in the specification thereof may be implemented in hardware, software, or as a combination of hardware and software.

When the methods are implemented in software, a computer-readable storage medium configured to store one or more programs (software modules) may be provided. The one or more programs stored in the computer-readable storage medium may be configured to be executable by one or more processors within an electronic device. The one or more programs may include instructions that cause the electronic device to perform the methods according to claims of the disclosure or embodiments described in the specification thereof.

The programs (software modules or software) may be stored in non-volatile memories including a random access memory (RAM) and a flash memory, a read only memory (ROM), an electrically erasable programmable ROM (EEPROM), a magnetic disc storage device, a compact disc-ROM (CD-ROM), a digital versatile disc (DVD), other type optical storage devices, or a magnetic cassette. Alternatively, the programs may be stored in a memory implemented by a combination of some or all of the above-described memories. Further, the electronic device may include a plurality of such memories.

Also, the programs may be stored in an attachable storage device which may access the electronic device through a communication network, such as the Internet, the Intranet, a local area network (LAN), a wide LAN (WLAN), or a storage area network (SAN), or through a communication network implemented by a combination thereof. Such a storage device may access a terminal configured to perform embodiments via an external port. Further, a separate storage device on the communication network may access a terminal configured to perform embodiments.

In the above-described specific embodiments, an element included in the disclosure is expressed in a singular or plural form according to a presented specific embodiment. However, the singular or plural expression is appropriately selected according to the presented situation for convenience of description, and the disclosure is not limited to a single element or multiple elements thereof. An element expressed in the plural form may be configured as a single element, or an element expressed in the singular form may be configured as multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A terminal in a wireless communication system, the terminal comprising:
   at least one transceiver; and
   a controller coupled with the at least one transceiver, and configured to:
      determine a first beam as a serving beam of the terminal based on channel qualities of a plurality of beams of the terminal,
      obtain synchronization information of the first beam of the terminal,
      obtain a first difference between a previous cell time of a second beam of the terminal and a current cell time of the second beam, wherein the second beam is different from the first beam,
      obtain new synchronization information of the serving beam according to the first difference,
      obtain at least one channel quality of the plurality of beams based on the new synchronization information, and
      update the serving beam based on the obtained at least one channel quality.

2. The terminal of claim 1, wherein the controller is, in order to obtain the new synchronization information, further configured to:
   obtain a second difference between a previous cell time of the first beam of the terminal and a current cell time of the first beam of the terminal and
   obtain the new synchronization information of the serving beam according to the second difference.

3. The terminal of claim 2, wherein the controller is further configured to:
   before receiving a signal using the serving beam, obtain channel qualities of first neighboring beams different from the serving beam in a first beamforming interval, and
   after receiving the signal using the serving beam, obtain channel qualities of second neighboring beams different from the first neighboring beams in a second beamforming interval.

4. The terminal of claim 3, wherein a number of the first neighboring beams and a number of the second neighboring beams are constants.

5. The terminal of claim 3, wherein a number of the second neighboring beams scheduled in the second beamforming interval is determined based on at least one of a synchronization variance of the serving beam or the channel qualities of the first neighboring beams.

6. The terminal of claim 2, wherein the controller is further configured to:
based on identifying that one of the first difference or the second difference is larger than or equal to a designated threshold, obtain a synchronization tracking by scheduling the serving beam.

7. The terminal of claim 2, wherein the controller is, in order to obtain the second difference, further configured to:
obtain the previous cell time by receiving a signal using the first beam in a first cycle, and
obtain the current cell time by receiving at least one signal by using the first beam in a second cycle subsequent to the first cycle.

8. The terminal of claim 1, wherein the controller is further configured to:
in case that, among the at least one channel quality of the plurality of beams, a channel quality higher than a channel quality of the first beam exists, change the serving beam to a beam corresponding to a highest channel quality among the plurality of beams, and
in case that, among the at least one channel quality of the plurality of beams, the channel quality higher than the channel quality of the first beam does not exist, maintain the first beam as the serving beam.

9. The terminal of claim 1, wherein the synchronization information of the serving beam comprises a cell time offset of a serving cell.

10. The terminal of the claim 9, wherein the new synchronization information is obtained by compensating the cell time offset of the serving cell using the first difference.

11. A method performed by a terminal in a wireless communication system, the method comprising:
determining a first beam as a serving beam of the terminal based on channel qualities of a plurality of beams of the terminal;
obtaining synchronization information of the first beam of the terminal;
obtaining a first difference between a previous cell time of a second beam of the terminal and a current cell time of the second beam, wherein the second beam is different from the first beam;
obtaining new synchronization information of the serving beam according to the first difference;
obtaining at least one channel quality of the plurality of beams based on the new synchronization information; and
updating the serving beam based on the obtained at least one channel quality.

12. The method of claim 11, wherein the updating obtaining of the new synchronization information comprises:
obtaining a second difference between a previous cell time of the first beam of the terminal and a current cell time of the first beam of the terminal, and
obtaining the new synchronization information of the serving beam according to the second difference.

13. The method of claim 12,
before receiving a signal using the serving beam, obtaining channel qualities of first neighboring beams different from the serving beam in a first beamforming interval, and
after receiving the signal using the serving beam, obtaining channel qualities of second neighboring beams different from the first neighboring beams in a second beamforming interval.

14. The method of claim 13, wherein a number of the first neighboring beams and a number of the second neighboring beams are constants.

15. The method of claim 13, wherein a number of the second neighboring beams scheduled in the second beamforming interval is determined based on a synchronization variance of the serving beam.

16. The method of claim 12, further comprising:
based on identifying that one of the first difference or the second difference is larger than or equal to a designated threshold, obtaining a synchronization tracking by scheduling the serving beam.

17. The method of claim 12, wherein the obtaining of the second difference comprises:
obtaining the previous cell time by receiving a signal using the first beam in a first cycle; and
obtaining the current cell time by receiving at least one signal by using the first beam in a second cycle subsequent to the first cycle.

18. The method of claim 11, further comprising:
in case that, among the at least one channel quality of the plurality of beams, a channel quality higher than a channel quality of the first beam exists, changing the serving beam to a beam corresponding to a highest channel quality among the plurality of beams, and
in case that, among the at least one channel quality of the plurality of beams, the channel quality higher than the channel quality of the first beam does not exist, maintaining the first beam as the serving beam.

19. The method of claim 11, wherein the synchronization information of the serving beam comprises a cell time offset of a serving cell.

20. The method of the claim 19, wherein the new synchronization information is obtained by compensating the cell time offset of the serving cell using the first difference.

* * * * *